United States Patent
Schuh et al.

(10) Patent No.: US 10,281,507 B2
(45) Date of Patent: May 7, 2019

(54) GENERATOR SIZING

(71) Applicant: Kohler Co., Kohler, WI (US)

(72) Inventors: David Schuh, Cascade, WI (US); James Kukla, Kohler, WI (US)

(73) Assignee: Kohler Co., Kohler, WI (US)

( * ) Notice: Subject to any disclaimer, the term of this patent is extended or adjusted under 35 U.S.C. 154(b) by 386 days.

(21) Appl. No.: 14/942,394

(22) Filed: Nov. 16, 2015

(65) Prior Publication Data

US 2016/0146867 A1 May 26, 2016

Related U.S. Application Data

(60) Provisional application No. 62/082,997, filed on Nov. 21, 2014.

(51) Int. Cl.
| | | |
|---|---|---|
| *G01R 19/00* | (2006.01) | |
| *G01R 21/133* | (2006.01) | |
| *G06Q 50/06* | (2012.01) | |
| *G06F 17/50* | (2006.01) | |
| *H02J 3/00* | (2006.01) | |

(52) U.S. Cl.
CPC ....... *G01R 21/133* (2013.01); *G01R 19/0092* (2013.01); *G06F 17/5004* (2013.01); *G06Q 50/06* (2013.01); *G06F 2217/78* (2013.01); *H02J 2003/007* (2013.01); *Y02E 60/76* (2013.01); *Y04S 40/22* (2013.01)

(58) Field of Classification Search
CPC . G05B 15/02; G05F 1/66; H04L 67/10; Y04S 40/22; G06F 1/26; G06F 17/5009; G06F 17/5004; G06F 2217/78; H02J 2003/007

USPC .......................................... 700/17, 291, 295
See application file for complete search history.

(56) References Cited

U.S. PATENT DOCUMENTS

| 4,419,619 A | 12/1983 | Jindrick et al. |
| 4,455,619 A | 6/1984 | Masui et al. |

(Continued)

FOREIGN PATENT DOCUMENTS

| CN | 102722764 | 10/2012 |
| EP | 1261096 | 11/2002 |

(Continued)

OTHER PUBLICATIONS

Kurdi, Chad, Generator Sizing Cummins Software, Feb. 14, 2012, youtube.com, https://www.youtube.com/watch?v=uxyzAOGU4rQ.

(Continued)

*Primary Examiner* — John E Breene
*Assistant Examiner* — Jeffrey P Aiello
(74) *Attorney, Agent, or Firm* — Lempia Summerfield Katz LLC

(57) ABSTRACT

Customized hardware provides a generator sizing interface to the user for selecting individual loads that may be present at a particular facility of building. The hardware and/or generator sizing interface receives one or more load selections from the user and, in response, generates a single line diagram or a one line diagram for power flow analysis based on the load selections. The hardware and/or generator sizing interface accesses a database for power requirements for the load selections of the diagram. A List of potential generators or an optimal generator is identified based at least in part on the power requirement of the load selections.

19 Claims, 22 Drawing Sheets

(56) References Cited

U.S. PATENT DOCUMENTS

| | | | |
|---|---|---|---|
| 4,862,376 A | 8/1989 | Ferriter et al. |
| 5,317,525 A | 5/1994 | Taoka et al. |
| 5,347,466 A | 9/1994 | Nichols et al. |
| 5,355,317 A | 10/1994 | Talbott et al. |
| 5,357,440 A | 10/1994 | Talbott et al. |
| 5,497,334 A | 3/1996 | Russell et al. |
| 5,566,085 A | 10/1996 | Marceau et al. |
| 5,666,297 A | 9/1997 | Britt et al. |
| 5,732,192 A | 3/1998 | Malin et al. |
| 5,754,738 A | 5/1998 | Saucedo et al. |
| 5,844,554 A | 12/1998 | Geller et al. |
| 5,917,730 A | 6/1999 | Rittie et al. |
| 6,021,402 A | 2/2000 | Takriti |
| 6,112,015 A | 8/2000 | Planas et al. |
| 6,249,714 B1 | 6/2001 | Hocaoglu et al. |
| 6,396,279 B1 | 5/2002 | Gruenert |
| 6,442,515 B1 | 8/2002 | Varma et al. |
| 6,530,065 B1 | 3/2003 | McDonald et al. |
| 6,535,370 B1 | 3/2003 | Papallo, Jr. et al. |
| 6,615,166 B1 | 9/2003 | Guheen et al. |
| 6,653,821 B2 | 11/2003 | Kern et al. |
| 6,681,156 B1 | 1/2004 | Weiss |
| 6,701,298 B1 | 3/2004 | Jutsen |
| 6,733,384 B2 | 5/2004 | Lantz |
| 6,816,326 B2 | 11/2004 | Nattermann et al. |
| 6,845,299 B2 | 1/2005 | Christiane et al. |
| 6,847,853 B1 | 1/2005 | Vinciarelli et al. |
| 6,853,930 B2 | 2/2005 | Hayashi et al. |
| 6,868,311 B2 | 3/2005 | Chiang et al. |
| 6,885,915 B2 | 4/2005 | Rehtanz et al. |
| 6,892,361 B2 | 5/2005 | Kandogan |
| 6,907,381 B2 | 6/2005 | Hayashi et al. |
| 6,996,508 B1 | 2/2006 | Culp et al. |
| 7,021,974 B2 | 4/2006 | Sichner et al. |
| 7,024,649 B2 | 4/2006 | Collmeyer et al. |
| 7,058,916 B2 | 6/2006 | Phelps et al. |
| 7,065,472 B2 | 6/2006 | Hayashi et al. |
| 7,103,434 B2 | 9/2006 | Chernyak et al. |
| 7,233,843 B2 | 6/2007 | Budhraja et al. |
| 7,288,921 B2 | 10/2007 | Huff et al. |
| 7,330,767 B2 | 2/2008 | Thiele et al. |
| 7,335,072 B2 | 2/2008 | Rzadki et al. |
| 7,353,475 B2 | 4/2008 | White et al. |
| 7,385,300 B2 | 6/2008 | Huff et al. |
| 7,386,832 B2 | 6/2008 | Brunner et al. |
| 7,398,194 B2 | 7/2008 | Evans et al. |
| 7,406,364 B2 | 7/2008 | Andren et al. |
| 7,429,201 B2 | 9/2008 | Rzadki et al. |
| 7,440,813 B2 | 10/2008 | Elhanan et al. |
| 7,441,225 B2 | 10/2008 | Boutin et al. |
| 7,475,000 B2 | 1/2009 | Cook et al. |
| 7,509,596 B2 | 3/2009 | Koo et al. |
| 7,526,393 B2 | 4/2009 | Thurmond et al. |
| 7,636,650 B2 | 12/2009 | Khalil |
| 7,676,721 B2 | 3/2010 | Kim |
| 7,702,421 B2 | 4/2010 | Sullivan et al. |
| 7,725,299 B2 | 5/2010 | Ramani et al. |
| 7,741,730 B2 | 6/2010 | Level et al. |
| 7,826,990 B2 | 11/2010 | Nasle et al. |
| 7,860,690 B2 | 12/2010 | Gadamsetty et al. |
| 7,860,702 B1 | 12/2010 | Evans et al. |
| 7,873,442 B2 | 1/2011 | Tsui |
| 7,882,394 B2 | 2/2011 | Hosek et al. |
| 7,974,809 B2 | 7/2011 | Witter et al. |
| 8,014,964 B1 | 9/2011 | Khalsa |
| 8,024,701 B2 | 9/2011 | Cote |
| 8,027,795 B2 | 9/2011 | Van Gorp et al. |
| 8,065,654 B2 | 11/2011 | Shiihara et al. |
| 8,068,923 B2 | 11/2011 | Piche |
| 8,069,016 B2 | 11/2011 | Feldman et al. |
| 8,116,916 B1 | 2/2012 | Zeanah et al. |
| 8,126,685 B2 | 2/2012 | Nasle |
| 8,131,401 B2 | 3/2012 | Nasle |
| 8,131,403 B2 | 3/2012 | Forbes, Jr. et al. |
| 8,155,943 B2 | 4/2012 | Nasle |
| 8,166,452 B2 | 4/2012 | Kinnucan, Jr. et al. |
| 8,195,437 B2 | 6/2012 | Timmerhoff |
| 8,280,696 B1 | 10/2012 | Aarstein et al. |
| 8,307,289 B2 | 11/2012 | Shah et al. |
| 8,321,827 B2 | 11/2012 | Sato |
| 8,330,297 B2 | 12/2012 | Pines |
| 8,359,248 B2 | 1/2013 | Witter et al. |
| 8,397,210 B2 | 3/2013 | Dutta et al. |
| 8,417,061 B2 | 4/2013 | Kennedy et al. |
| 8,433,531 B2 | 4/2013 | Hancock et al. |
| 8,533,514 B2 | 9/2013 | Rogers et al. |
| 8,538,593 B2 | 9/2013 | Sun et al. |
| 8,543,343 B2 | 9/2013 | Jones et al. |
| 8,549,422 B2 | 10/2013 | Gutha et al. |
| 8,560,134 B1 | 10/2013 | Lee |
| 8,577,652 B2 | 11/2013 | Oh |
| 8,600,574 B2 | 12/2013 | Hamilton, II et al. |
| 8,676,721 B2 | 3/2014 | Piovesan et al. |
| 8,694,291 B2 | 4/2014 | Chu et al. |
| 8,706,309 B2 | 4/2014 | Schweitzer, III et al. |
| 8,779,624 B2 | 7/2014 | Sparling et al. |
| D775,144 S | 12/2016 | Vazquez |
| D777,753 S | 1/2017 | Matsuguma et al. |
| D778,284 S | 2/2017 | Dahlen |
| D782,511 S | 3/2017 | Matsuguma et al. |
| D783,665 S | 4/2017 | Caporal et al. |
| 2002/0193978 A1 | 12/2002 | Soudier |
| 2003/0085621 A1 | 5/2003 | Potega |
| 2003/0131323 A1 | 7/2003 | McConaghy |
| 2005/0012396 A1 | 1/2005 | Chidambaram et al. |
| 2005/0154566 A1 | 7/2005 | Farrell et al. |
| 2006/0100934 A1 | 5/2006 | Burr et al. |
| 2007/0219764 A1 | 9/2007 | Backe et al. |
| 2008/0015823 A1 | 1/2008 | Arnold et al. |
| 2008/0262820 A1* | 10/2008 | Nasle .................... G06Q 10/04 703/18 |
| 2009/0031264 A1 | 1/2009 | Rittman et al. |
| 2009/0083019 A1 | 3/2009 | Nasle |
| 2009/0099832 A1* | 4/2009 | Nasle ................. G06F 17/5009 703/18 |
| 2010/0217750 A1 | 8/2010 | Tokoro et al. |
| 2011/0016342 A1 | 1/2011 | Rowan et al. |
| 2011/0106654 A1 | 5/2011 | Lee et al. |
| 2011/0153524 A1 | 6/2011 | Schnackel |
| 2011/0196546 A1 | 8/2011 | Muller et al. |
| 2011/0205245 A1 | 8/2011 | Kennedy et al. |
| 2011/0264418 A1 | 10/2011 | Szewczyk et al. |
| 2011/0307110 A1* | 12/2011 | Sharma .................... G06F 1/26 700/291 |
| 2011/0320848 A1 | 12/2011 | Perry et al. |
| 2012/0011378 A1 | 1/2012 | Dalton et al. |
| 2012/0065944 A1 | 3/2012 | Nielsen et al. |
| 2012/0097666 A1* | 4/2012 | Pohl ........................ H05B 6/06 219/663 |
| 2012/0101642 A1* | 4/2012 | Pohl ................. H01J 37/32908 700/287 |
| 2012/0221986 A1 | 8/2012 | Whitford et al. |
| 2013/0024037 A1 | 1/2013 | Jin et al. |
| 2013/0042616 A1 | 2/2013 | Runkle et al. |
| 2013/0074033 A1 | 3/2013 | Hall et al. |
| 2013/0262040 A1 | 10/2013 | Buckley |
| 2013/0275174 A1 | 10/2013 | Bennett et al. |
| 2013/0305091 A1 | 11/2013 | Stan et al. |
| 2014/0025347 A1 | 1/2014 | Kim et al. |
| 2014/0058576 A1* | 2/2014 | Jackson .................... G06F 1/26 700/297 |
| 2014/0214373 A1 | 7/2014 | Jardin et al. |
| 2015/0051749 A1* | 2/2015 | Hancock ................ G06Q 50/06 700/295 |
| 2016/0146867 A1 | 5/2016 | Schuh et al. |

FOREIGN PATENT DOCUMENTS

| | | |
|---|---|---|
| EP | 2038782 | 12/2011 |
| WO | WO2001090961 | 11/2001 |
| WO | WO2009042772 | 4/2009 |
| WO | WO2014035080 | 3/2014 |

(56) References Cited

FOREIGN PATENT DOCUMENTS

OTHER PUBLICATIONS

Loftin Equipment, Kohler Releases Power Solutions Center, Jun. 4, 2015, Loftinequip.com, http://www.loftinequip.com/hello-world/.
BlockSim: System Reliability and Maintainability Analysis Software Tool, Sep. 29, 2015, ReliaSoft.com/BlockSim/index.html.
Data Acquisition, Controlling and Monitoring, Jun. 2013, Dasy Lab.
DesignBase Power Engineering Software, accessed Dec. 15, 2014, Power Analytics.
Electrical Engineering and Design System, Documentation and Management for the Entire Lifecycle, 2011, aveva.com.
Generator Set Sizing, Oct. 2008, Version 1.10.00, EDSA Micro Corporation.
IntelliTeam SG, Automatic Restoration System, Featuring IntelliTeam Designer, Dec. 7, 2015, S&C Electric Company.
Paladin DesignBase 5.0, Product Brief, accessed Nov. 3, 2015, DesignBase.
Power Analytics Paladin Software Overview, accessed Nov. 3, 2015, poweranalytics.com/designbase/pso&sizing.php.
Protective Device Coordination, Oct. 2008, Version 6.10.00, EDSA Micro Corporation.
PSS ODMS, Product Overview, 2014, Siemens PTI.
Sequence-of-Operation, accessed Dec. 15, 2014, etap.com/protective-device-coordination/protective-device-sequence-operation.htm.
Windchill Quality Solutions, Curriculum Guide, 2011, PTC University (Relex).
Windchill RBD, 2010, relicore.en/index.php/products/winchill-products-solutions/rbd.
XA/21 EMS, Energy Management System, accessed Dec. 15, 2014, GE Digital Energy.
Abby Lipperman et al: Comparing generator sizing software, Consulting-Specifying Engineer, Dec. 12, 2013, XP055260893, Retrieved from the Internet: URL: https://www.csemag.com/single-article/comparing-generator-sizing-software/30c655774c6b5c44edf7261a975d34b6.html?tx_ttnews%5BsViewPointer%5D=1 [retrieved on Mar. 24, 2016].
European Search Report for related European Application No. 15195615.8 dated Apr. 7, 2016.

* cited by examiner

POWER SYSTEMS

SELECT GENSET

| RATING KW @ 133C | DERATING KW | QTY. GENSET | ENGINE BHP | MAX. START. KW | MAX. START. KVA | MAX. STEP VOLT. DIP | MAX. STEP FREQ. DIP | MAX. VTHD | AVAILABLE KW USED | MODEL | ALTERNATOR | |
|---|---|---|---|---|---|---|---|---|---|---|---|---|
| 360 | 360 | 1 | 538 | 401 | 1325 | 2.01% | 2.96% | 2.02% | 66.27% | 350REOZJB | 4M4019 | |
| 350 | 350 | 1 | 538 | 401 | 1550 | 1.95% | 1.51% | 2.10% | 68.17% | 350REOZJ | 5M4027 | |
| 350 | 350 | 1 | 538 | 401 | 1350 | 2.21% | 2.51% | 2.11% | 68.17% | 350REOZJ | 4M4021 | |
| 350 | 350 | 1 | 538 | 401 | 1325 | 2.13% | 1.51% | 2.02% | 68.17% | 350REOZJ | 4M4019 | OPTIMUM GENERATOR |
| *300* | *296.17* | *1* | *463* | *345* | *980* | *2.78%* | *3.03%* | *3.51%* | *80.56%* | *300REOZJ* | *4D4J3* | *EXCEEDS VOLTAGE HARMONICS IN STEP 4* |
| *280* | *276.42* | *1* | *422* | *315* | *980* | *2.67%* | *3.93%* | *3.51%* | *86.31%* | *275REOZJE* | *4D4J3* | *EXCEEDS VOLTAGE HARMONICS IN STEP 4* |

LOAD REQUIREMENTS

RUNNING KW ☐
RUNNING KVA ☐
RUNNING P.F. ☐
MAX. START. KW ☐ IN STEP ☐
MAX. START. KVA ☐ IN STEP ☐

PERFORMANCE

☐ VOLTAGE DIP
☐ FREQUENCY DIP
☐ VOLTAGE HARMONIC DISTORTION
☐ GENSET LOADED

USER LIMIT

☐ VOLTAGE DIP
☐ FREQUENCY DIP
☐ VOLTAGE HARMONIC DISTORTION
☐ GENSET MIN. LOADED
☐ GENSET MAX. LOADED

SELECTED GENSET: 350REOZJ 4M4019

POWER SOLUTIONS CENTER

TOTAL SYSTEM INTEGRATION
GENERATORS|TRANSFER SWITCHES|SWITCHGEAR |CONTROLS

PROJECTS
LOAD PROFILE
SELECT GENSET
ADDITIONAL TOOLS
CREATE SPEC
ADDITIONAL INFORMATION

OPTIMUM GENSET | REPORT

FIG. 14

GENERATOR SIZING

CROSS REFERENCE TO OTHER APPLICATIONS

This application claims the benefit of U.S. Provisional Application Ser. No. 62/082,997, filed Nov. 21, 2014, which is hereby incorporated by reference in its entirety.

FIELD

This disclosure relates in general to systems and methods for generator sizing, and in more particular, to identification of an optimal generator based on load selections made in a generator sizing interface.

BACKGROUND

An engine-generator set, which may be referred to as a generator or a genset, may include an engine and an alternator or another device for generating electrical energy or power. One or more generators may provide power to a load through a generator bus and circuit breakers or other types of switches. A generator system including two or more generators may be connected to a generator bus and to other generators through circuit breakers. Each generator may include a local generator controller that manages the circuit breakers and paralleling operations with the other generators.

Generators are available in many sizes. The cost of operating the generator may be proportional to size. Thus, most users would prefer to select the smallest generator that comfortably meets the user's current or future power needs. The primary factor in selecting a generator size is load. The load refers to the electrical requirements of the devices that are powered by the generator.

BRIEF DESCRIPTION OF THE DRAWINGS

Exemplary embodiments are described herein with reference to the following drawings.

FIG. 7 illustrates an example generator sizing selection interface.
FIG. 11 illustrates an example fuel piping calculation.
FIG. 14 illustrates an example request for quote interface.

DETAILED DESCRIPTION

An electrical engineer or a skilled technician may calculate generator sizing given the specific requirements of a building or facility. The calculation involves complicated power calculations as well as estimations based on rules of thumb of the industry. However, these manual calculations are subject to inaccuracies and consume a significant amount of time. The following embodiments provide improvements to the technology of generator sizing because the accuracy of the selection is improved and the efficiency of the calculations are improved.

The following embodiments provide customized hardware for calculating generator sizes automatically. The customized hardware provides a generator sizing interface to the user for selecting individual loads that may be present at a particular facility or building. The hardware and/or generator sizing interface receives one or more load selections from the user and, in response, generates a single line diagram or a one line diagram for power flow analysis based on the load selections. The hardware and/or generator sizing interface accesses a database for power requirements for the load selections of the diagram. A list of potential generators or an optimal generator is identified based at least in part on the power requirement of the load selections.

Figure 1:
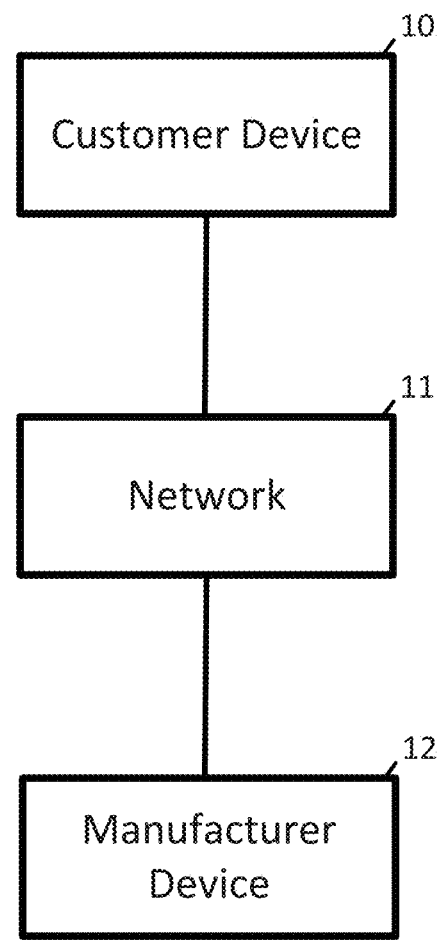
FIG. 1 illustrates an example system for generator sizing.

FIG. 1 illustrates an example system for generator sizing. The system includes a customer device 10, a network 11, and a manufacturer device 12. The customer device 10 may be a personal computer, a laptop computer, a tablet computer, a mobile device, or another device configured to receive user inputs for assembling a one line diagram or single line diagram. The one line diagram is an electrical diagram for the power system of a building, boat, or other area or facility having one or more loads. The loads are power consuming devices. The customer device 10 may be configured to calculate an optimal generator size or model. The network 11 may be a communication network (e.g., the Internet) configured to forward data packets or messages between the customer device 10 and the manufacturer device 12. The manufacturer device 12 may be another computer configured to receive generator sizing information from the customer device 10 and dispatch a distributor, dealer, or manufacturer agent to contact a user of the customer device 10 regarding the installation of a generator. In another example, the manufacturer device 12 may receive load requirement data from the customer device 10 and calculate an optimal generator size or model based on the load requirement data.

Figure 2:
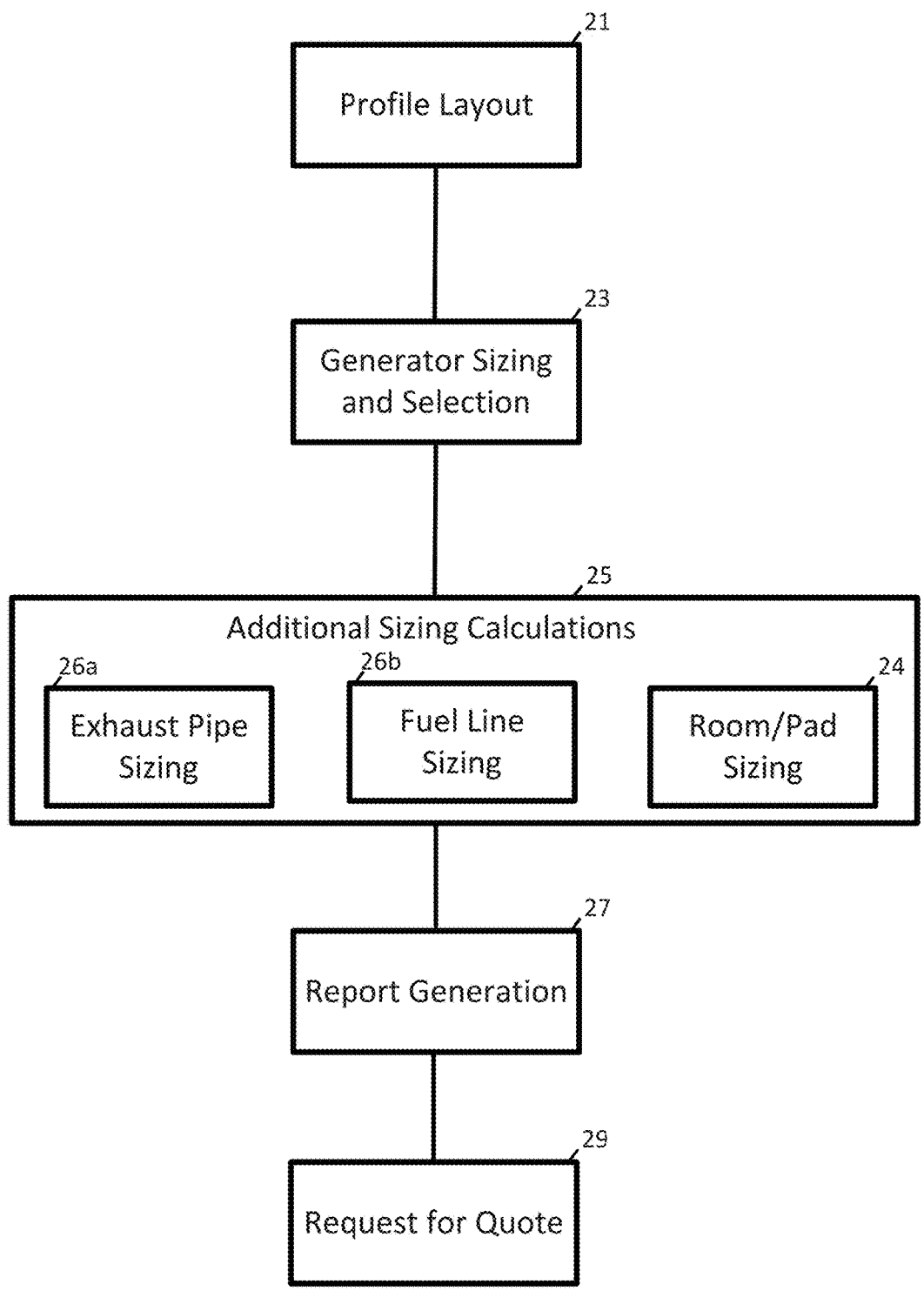
FIG. 2 illustrates an example block diagram for modules or components executable by the customer device.

FIG. 2 illustrates a block diagram for modules or components executable by the customer device 10. The block diagram includes a profile layout 21, generator sizing selection 23, additional sizing selections 25, report generation 27, and a request for quote interface 29. The profile layout 21 is a generator sizing interface that allows a user to build a one line diagram describing the electrical loads of a system. The generator sizing selection 23 selects an optimal generator for the system. The additional sizing selections 25 include supplemental selections of an auxiliary component parameter (e.g., exhaust pipe sizing 26a, fuel line sizing 26b, and room and/or pad sizing 24) for the optimal generator. The report generation interface 27 allows the user to select a textual output for the optimal generator. The request for quote interface 29 allows the user to communicate with the manufacturer device 12. Additional different or fewer components may be included.

Figure 3:
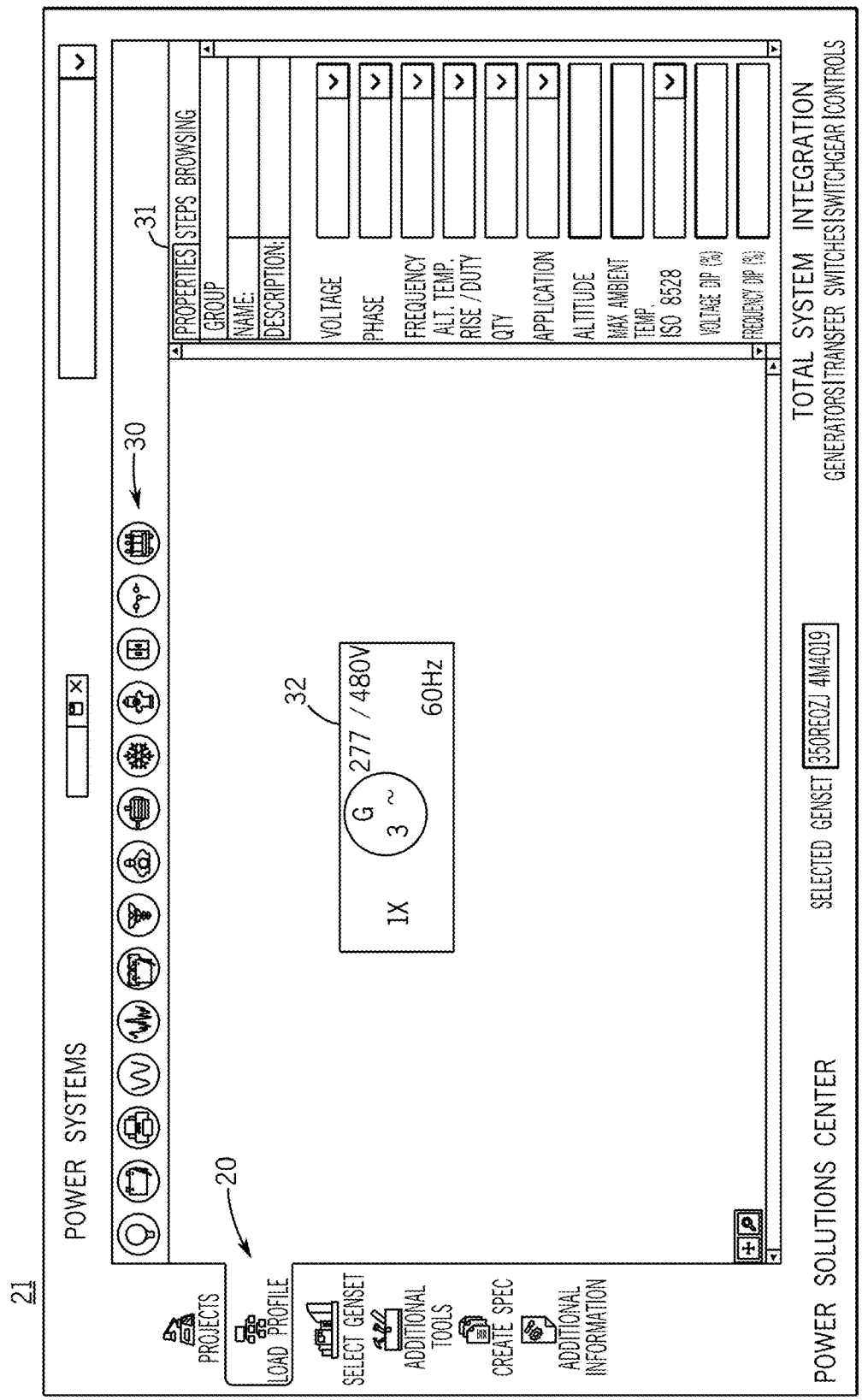
FIG. 3 illustrates an example for the initial state for the profile layout.

FIG. 3 illustrates an example for the initial state for the profile layout 21. The profile layout 21 includes a set of navigation icons 20, a set of load icons 30, a properties pane 31, and a source icon 32. Additional, different, or fewer elements may be included in the profile layout 21.

The set of load icons 30 may include graphical indicators that represent different types of loads or power switching devices. The graphical indicators may describe the appearance of the device. The graphical indicators represent the load devices without reference to technical symbols. The types of loads may include lighting, a battery charger, office equipment, a uninterruptible power supply (UPS), medical equipment, a welder, a motor, an air conditioner, a fire pump, an elevator, or another device. The set of icon selectors 30 may be categorized into linear loads (e.g., motor based loads) and non-linear loads. The motor based loads may include an air conditioner, a fire pump, an elevator, or other devices including a motor or modeled as a motor. The non-linear loads may include the lighting, battery charger, office equipment, UPS, and medical equipment. Each of the loads may have predetermined characteristics and/or operating requirements stored by the customer device 10. The icon selectors 30 may include a capacitor for power factor correction.

The icon selectors 30 may include a configurable miscellaneous non-linear load and a configurable miscellaneous linear load. The user can enter parameters or characteristics describing the load. The other icon selectors 30 are also configurable. The characteristics describing the load may be divided into basic settings, moderate settings, and advanced settings. The basic settings may include a voltage rating and a power rating. The moderate settings may include a number of phases, a starting method, a sequence step setting, a motor code, or another setting. The advanced settings may include power factor, efficiencies, harmonics, starting load versus running load properties, or other quantities. Other categories or arrangements of the settings may be used. The customer device 10 may allow the user to add customized icons for any type of load, source, or other electrical device.

The user may provide a user command to drag and drop the icon selectors 30 to the source icon in order for a one line diagram to be automatically constructed on the profile layout 21. When the icons are dropped on the project are of the profile layout 21, the icons are converted to a schematic form. There is no need for the user to draw wiring or connections between the icons. The customer device 10 automatically determines the arrangement of the icons and draws the connections between icons. The arrangement of the icons may be in a predetermined order. One example predetermined order is in the order of power requirements (e.g., for example highest power load on the left and lowest power load on the right). Another predetermined order is in order of category of load (e.g., non-linear loads on the left and linear loads on the right). Another predetermined order is based on the preferences of the user. The customer device 10 is configured to compare the load requirements of the loads and, based on the requirements, sort the loads entered by the user on the generator sizing interface.

Figure 4:
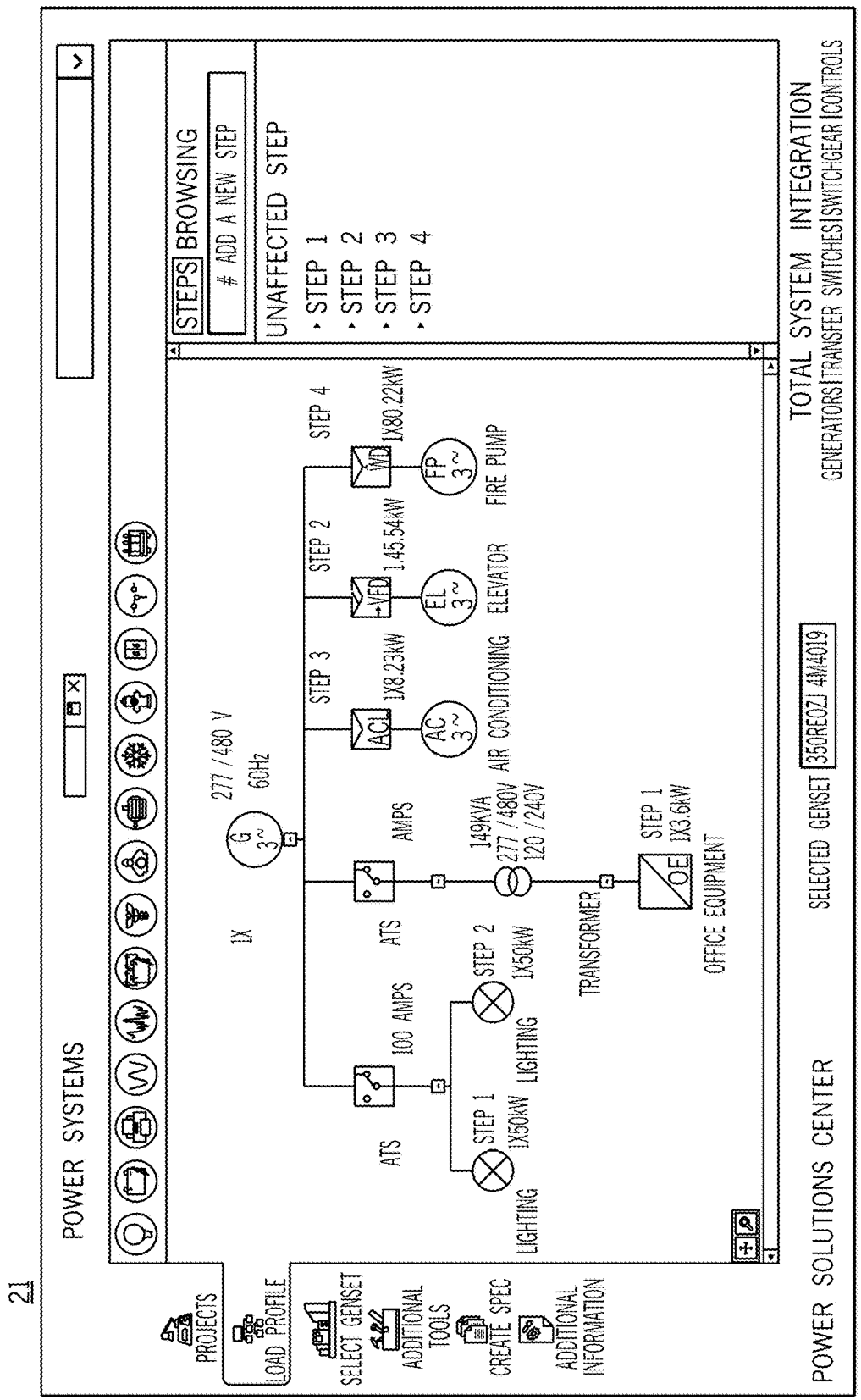
FIG. 4 illustrates an example one line diagram for the profile layout including the schematic form of one of the motor based icon selectors.

FIG. 4 illustrates a completed one line diagram for the profile layout 21 including the schematic form of one of the motor based icon selectors 30. The user may drag and drop the icon selectors 30 to the project area of the profile layout 21. The icon selectors 30 may be dropped on existing icons in the project area. The existing icons may include two groups: branch icons and leaf icons. The branch icons connect other icons to the single line diagram. The branch icons include sources, generator sets, transformers, breakers, and transfer switches. When the user drops one of the icon selectors 30 onto an existing branch icon, the customer device 10 automatically adds the selected icon to the single line diagram. The leaf icons include the loads that are connected to one or more branch icons. When the user drops one of the icon selectors 30 onto an existing leaf icon, the customer device 10 does not add the selected icon to the single line diagram, and optionally, presents an error message. The customer device 10 may also display an error indication (e.g., red circle or "X") as the selected icon hovers over or in the vicinity of a leaf icon.

Figure 5A:
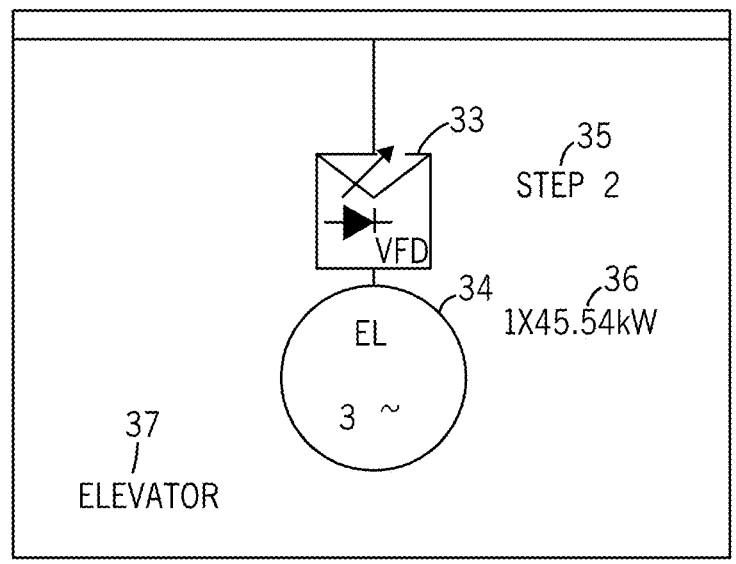
FIG. 5A illustrates an example leaf icon.
Figure 5B:
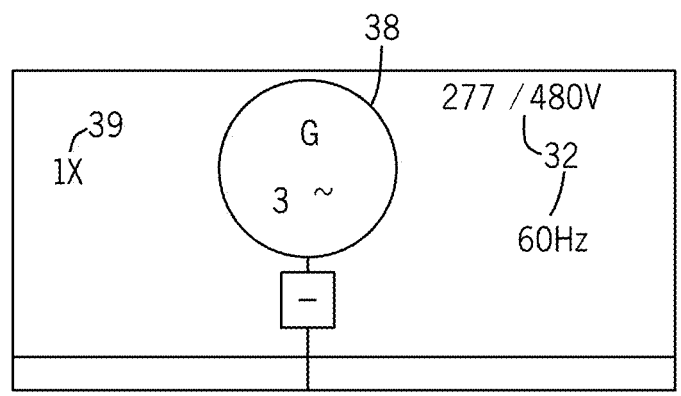
FIG. 5B illustrates an example branch icon.

FIG. 5A illustrates an example leaf icon (e.g., an elevator, motor-based load) in schematic form and FIG. 5B illustrates an example branch icon (e.g., a genset) in schematic form. The schematic form includes a load component 34, a starting component 33, a sequence indicator 35, a power indicator 36, and a load name 37. The load component 34 may be a standardized format defined by the National Electrical Manufacturers Association (NEMA), the Institute of Electrical and Electronics Engineers (IEEE), or another standards group. In one example, the graphical indicators for the icon selectors 30 resemble the appearance of the load devices, and the schematic form is a simplified line drawing that represents the same load devices. The sequence indicator 35 describes a timing sequence for the load, which is described in more detail below.

The starting component 33 for the motor based load may represent how the load is started. Examples for the starting component 33 include across the line, autotransformer, part winding, wye delta closed, wye delta open, variable frequency drive (VFD), soft start with ramp, or solid state current limit. The various starting components 33 may be associated with different electrical requirements (e.g., starting current). The power indicator 36 may list the power rating of the load. The load name 37 may list the name or category of the load.

For a source or branch icon, as shown in FIG. 5B, the schematic form may include a device component 38, a quantity indicator 39, and a source characteristics indicator 32. The device component 38 may include a standardized graphic for a generator, a transformer, a transfer switch, a breaker, or another branch icon. The characteristics indicator 32 may indicate the voltage rating of the device, the power rating of the device, the frequency of the device, or another characteristic. The quantity indicator 39 may include a numeric value for the number of devices of the type described by the device component 38 that are included in the single line diagram.

The quantity indicator 39 may be user configurable. That is, when the branch icon is a generator, the quantity indicator 39 describes a number of generators that supply power to the loads in the single line diagram. The customer device 10 may be configured to calculate the number of generators based on the load requirement of the single line diagram. In one example, the customer device 10 may determine whether any single generator can supply the load requirement. When no single generator can provide the load requirement, the customer device 10 may identify two generators that together can provide the load requirement. In one example, the customer device 10 may identify and compare all combinations of generators available to determine the optimal quantity and optimal models for the generators.

For a motor based load, the customer device 10 may provide a filter selection. The filter selection when activated causes the customer device 10 to model the load requirements with a filter for harmonics from the motor based load. When unselected the filter selection causes the customer device to model the load requirements without a filter for harmonics.

Figure 6:
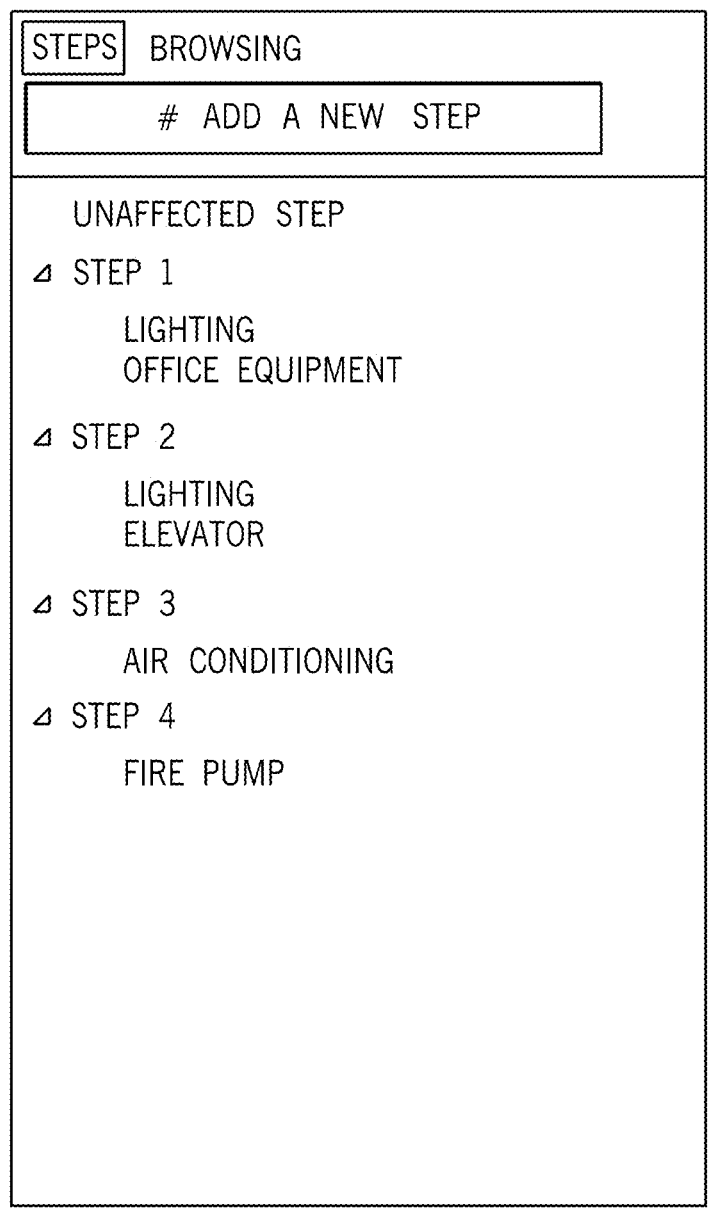
FIG. 6 illustrates an example time sequence for the loads of the profile layout.

FIG. 6 illustrates an example time sequence for the loads of the profile layout 21. The time sequence may define an order in which the loads are connected to a generator bus. The timing sequence may be arranged in steps (e.g., Step 1 to Step n). The duration of each time step may be based on the loads assigned to the time step. Loads may be associated with time periods that describe the length of time needed for the load to reach a steady state current or power. The duration of the time steps may be fixed (e.g., 10 seconds) or configurable by the user through the customer device 10.

The customer device 10 may automatically define the time steps. The customer device 10 may calculate the time steps according to a load timing algorithm. The quantity of time steps may be based on the size and/or the number of loads or devices of the profile layout 21. For example, each step may be allocated a specific number of loads or a specific aggregate power rating. The customer device 10 may select devices for each step based on the power requirement of the devices. The customer device 10 may arrange the devices in all combinations possible and select the arrangement that minimizes the maximum or peak power requirement, which reduces the size of the optimal generator. The customer device 10 may prioritize the loads based on a priority. The customer device 21 may store a priority value with each of the load devices. The customer device 21 may assign a first priority to a first class of loads or devices, a second priority to a second class of loads or devices, and a third priority to a third class of loads or devices. For example, life support systems in a hospital may be assigned the highest priority, the computer systems in the hospital may be assigned a second priority, and the lighting systems in the hospital may be assigned a third priority.

FIG. 7 illustrates an example generator sizing selection interface 23. The generator sizing selection interface 23 may include a list of possible generators. The customer device 10 may calculate load requirements based on the single line diagram. The load requirements may vary over time, such as according to the timing sequence. The customer device 10 may compare the load requirements to the performance of multiple available generators.

The optimal generator may be highlighted on the list. Other acceptable generators may be listed and selectable from the generator sizing selection interface 23. Unacceptable generators may also be listed and generator sizing selection interface 23 may include data indicative of reasons why those models of generators are unacceptable. Example reasons include "exceeds voltage rating," "higher than maximum load," "step n in the timing sequence exceeds current limit," and/or "insufficient starting power."

The generator sizing selection interface 23 may allow the user to prioritize or sort the list of generators according to one or more factors. The factors may include newest models, promotions, discounts, best reviews, safety ratings, costs or other factors. In one example, the user can sort all acceptable generators according to initial cost, operating cost, life cycle cost or other cost. The generator sizing selection interface 23 may allow the user to prioritize or sort the list of generator according to one or more features. The features may include mobile access, fuel type, efficiency, warranty duration, or other features.

The generator sizing selection interface 23 may allow the user to further limit the list of generators. The user may specify future load requirements. For example, the user may list additional loads that may be added in the future. The user may specify a percentage increase that is added to the load requirements before determining the optimal generator. The user may limit the generators by cost range.

The generator sizing selection interface 23 may include details of the load requirements based on the profile layout 21. The load requirements may include running real power, running reactive power, maximum starting real power, and/or maximum starting reactive power. The step or sequence number where the maximum powers occur may be listed. The user may adjust the timing sequence of the indicated step to attempt to cause the optimal generator to change to a smaller generator.

The generator sizing selection interface 23 may also display performance data. The performance data may include voltage dip, frequency dip, voltage harmonic distortion, and percent loaded. The performance data may list values for the generator and the load for each of these categories. The customer device 10 may receive an electrical parameter limit from the user via the generator sizing interface. The electrical parameter limit may describe a requirement of a building or facility. The electrical parameter limit may describe a regulatory or jurisdictional requirement (e.g., low flicker). The customer device 10 selects the optimal generator based on the electrical parameter limit. The electrical parameter limit may include a total harmonic distortion limit, a maximum frequency dip, or a maximum voltage dip. The customer device 10 may calculate a value for the electrical parameter at multiple instances in the single line diagram. For example, the customer device 10 may calculate and display the electrical parameter at each connection or load step in the single line diagram.

The customer device 10 may operate in multiple modes. The modes may be based on the expertise of the user. Example expertise modes include novice, average, and expert. In the novice mode, the customer device 10 may limit the settings available to the user to a first subset of settings. The first subset of settings may include a limited list of types of loads. The novice mode may also limit the number of technical details (e.g., performance details, timing sequence, or other data) that are visible to the user. The average mode may include a second subset of settings available to the user. The average mode may include more load options to the user and more technical data than the novice mode. The advanced mode may include a third subset of settings available to the user. The advanced more mode may include more load options to the user and more technical data than the average mode.

The customer device 10 may give the use the option of selecting a mode (e.g., novice, average, or advanced). In another example, the manufacturer device 12 may provide login information or other credentials that are associated with user levels. For example, a user license may specify the expertise of the user and associated cost of the generator sizing system. The user may be required to provide a certification number to activate the advance mode. The manufacturer device 12 may provide the user with an authentication code to activate one or more of the modes.

The modes may be based on the field of the user. Example field modes include waste water facility, hospital, grocery store, data center, boat, or another facility. One field mode may include a different set of load icons than another field mode. For example, the customer device 10 may store a first set of load icons for devices typically used at waste water facility, a second set of icons for devices typically used at hospital, a third set of icons for devices typically used at grocery stores, a fourth set of icons for devices typically used at a data center, and/or a fifth set of icons for devices typically used at a boat or marine setting.

In addition or in the alternative, the customer device 10 may calculate optimal sizing for an automatic transfer switch (ATS), a breaker, or a transformer. The transfer switch, a breaker, or transformer may be selected based on the sizes of the loads connected to the respective icons in the single line diagram. The customer device 10 may calculate the current required to start and run each device. The customer device 10 may sum the required currents across one or more time interfaces to determine the optimal ATS, transformer or breaker size. The ATS, transformer or breaker size may be a rated current or rated power. The generator sizing selection interface 23 may also include a list of transfer switches that would be acceptable in the position of the transfer switch of the single line diagram and an optimal transfer switch. The generator sizing selection interface 23 may also include a list of transformers that would be acceptable in the position of the transformer of the single line diagram and an optimal transformer. The generator sizing selection interface 23 may also include a list of breakers that would be acceptable in the position of the breaker of the single line diagram and an optimal breaker.

Figure 8:
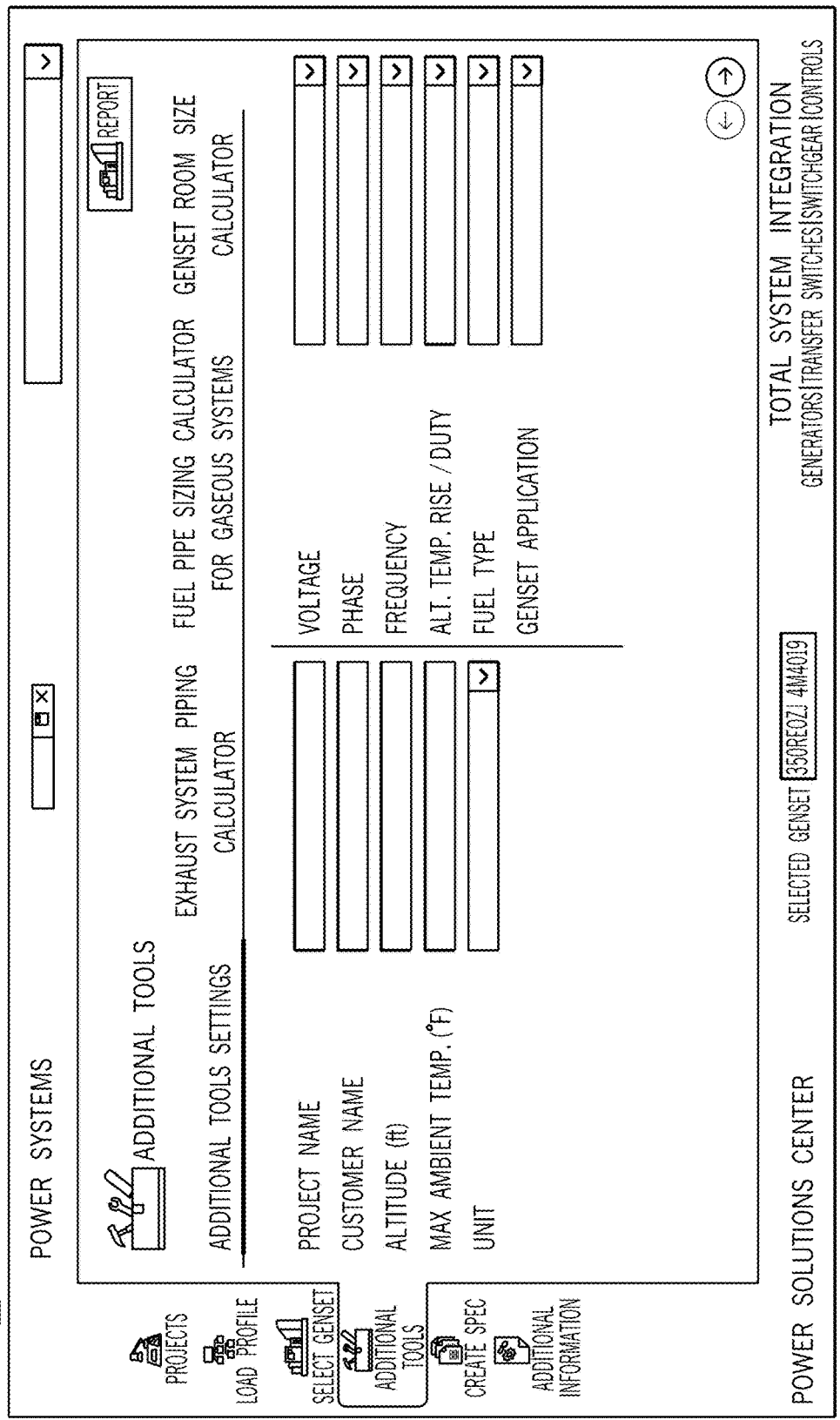
FIG. 8 illustrates example additional settings for the facility.

FIGS. 8-11 illustrate example features of the additional sizing selections 25. FIG. 8 illustrates additional settings for the facility. The additional settings may include altitude, project name, project location, maximum ambient temperature, units settings, voltage system, number of phases, fuel type, and general application. The customer device 10 selects the optimal generator as a function of the additional settings. The customer device 10 may calculate the optimal generator or combination of generator as a function of one or more of these additional settings.

Figure 9:
FIG. 9 illustrates an example exhaust system piping calculation.

FIG. 9 illustrates an exhaust system piping calculation. The customer device 10 may calculate the size of the exhaust pipe based on the generator model. The customer device 10 may access factory engine information from memory. The factory engine information may include exhaust flow, exhaust temperature or other characteristics of the generator. The customer device 10 may combine the factory engine information with user specific site data (e.g., additional piping dimensions) to calculate the minimum size of the exhaust piping for the generator set that will not exceed the backpressure requirements for the exhaust of the engine. The user may enter additional information for determining the piping needed for the generator.

Figure 10:
FIG. 10 illustrates an example room size calculation.

FIG. 10 illustrates an example room size calculation. The customer device 10 may calculate a minimum room size based on the generator model. The minimum room size may be based on recommended offsets between the generator and the room boundaries. The customer device 10 may calculate a pad size based on the generator model. The pad is a slab of concrete or other material for supporting the optimal generator (e.g., support pad).

The customer device 10 may calculate an estimated sound level based on the optimal generator or selected generator. The sound level may be a function of any combination of the generator model, distance from the generator model and generator accessories. The list of acceptable generators may be sortable according to the estimated sound level. The customer device 10 may generate a list of sound levels (e.g., decibels) at various distance levels from the generator.

Figure 11:
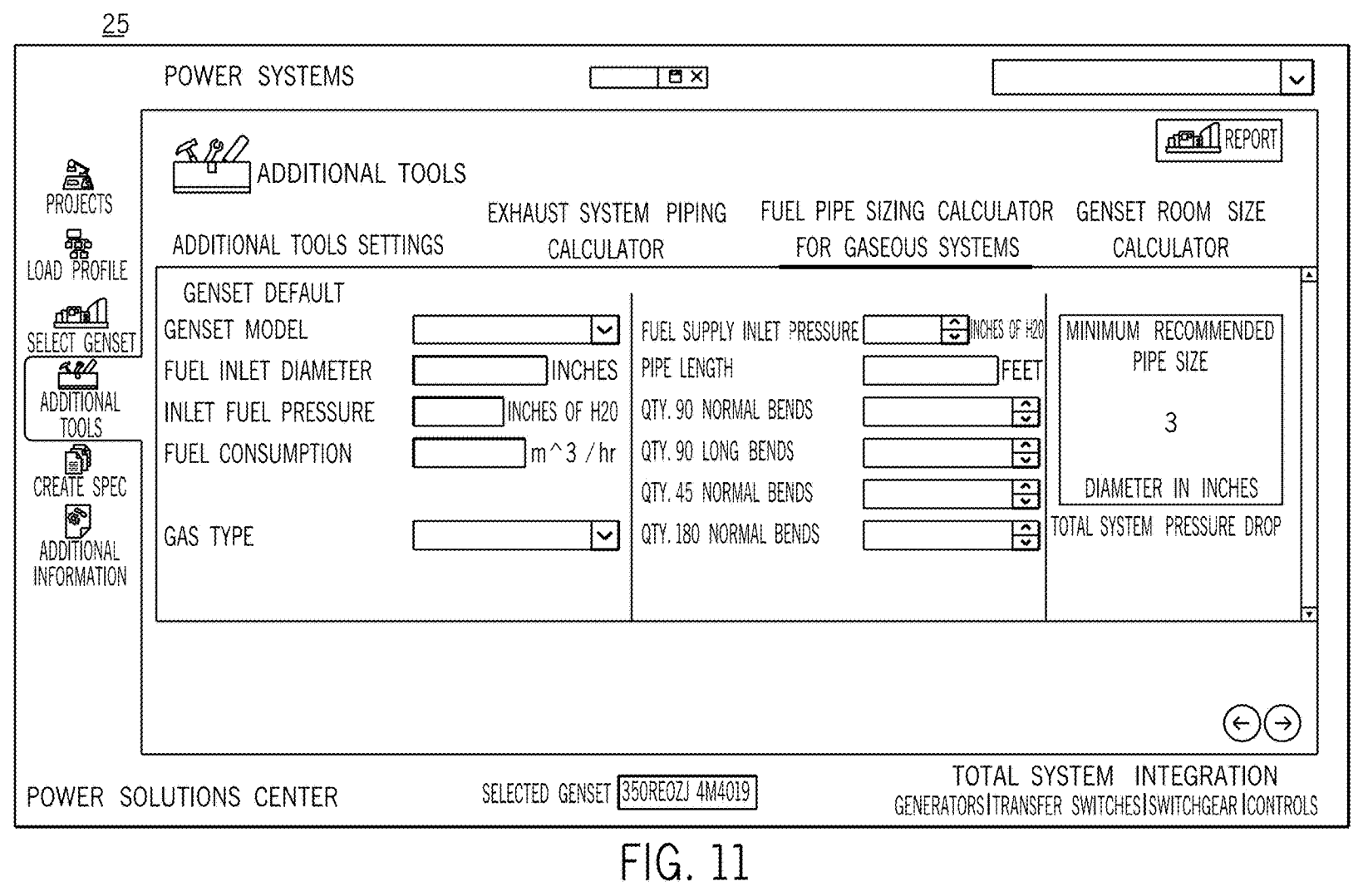

FIG. 11 illustrates an example fuel piping calculation. When a gaseous fuel is used, such as LP (liquefied petroleum) vapor, natural gas, well head gas or another gaseous fuel, the example fuel piping calculation is available on the additional sizing selections 25. The customer device 10 calculates a minimum recommended pipe size based on the optimal generator or optimal combination of generators selected. The minimum recommended pipe size may also be based on the specific type of gaseous fuel. The user may provide additional information regarding the fuel supply lines such as length, pressure, and turns in the piping. The turns may be described based on quantity and angle. The customer device 10 may calculate the pressure drop from the piping information and/or type of gaseous fuel. The minimum pipe size is calculated from the pressure drop.

Figure 12:
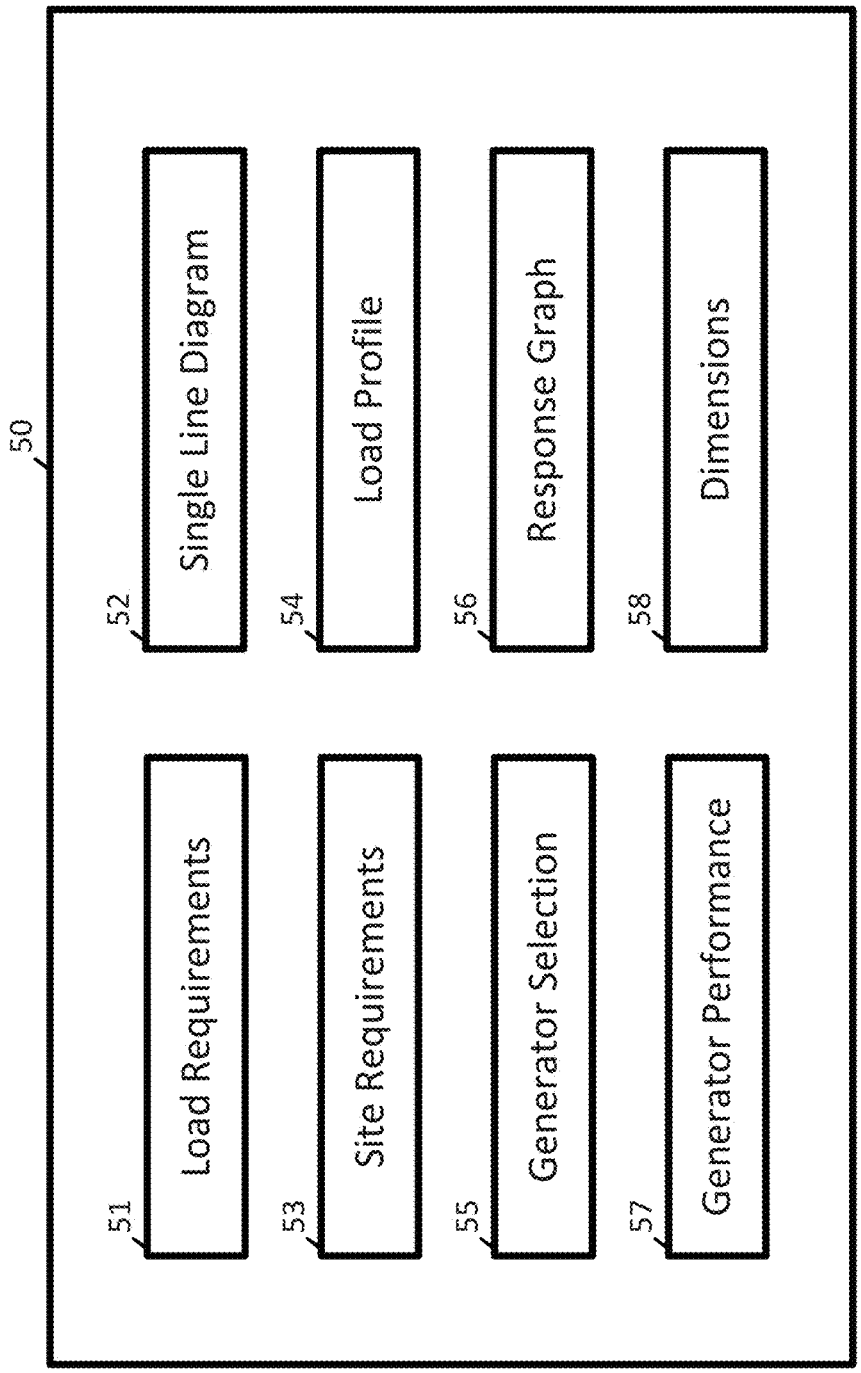
FIG. 12 illustrates an example report for generator sizing.

FIG. 12 illustrates an example report from the report 50 generated by the customer device 10 or manufacturer device 12. The report 50 may include load requirements 51, a single line diagram 52, site requirements 53, load profile 54, generator selection 55, voltage and frequency response 56, generator performance 57, and dimensions 58. The load requirements 51 may include running real power, running reactive power, maximum starting real power, and/or maximum starting reactive power. The single line diagram 52 may be copied from the profile layout 21. The site requirements 53 may include the facility information described above. The generator selection 55 may describe the optimal generator or combination of generators selected by the customer device 10. The generator performance 57 may describe the percentage of limits, dips, distortion and load for the specified load on the selected generator. The load profile 54 may include electrical requirements for each step of the timing sequence. The response graph 56 may include a plot of frequency and/or voltage over time for each step of the timing sequence. Additional examples for the report 50 are shown below.

Figure 13:
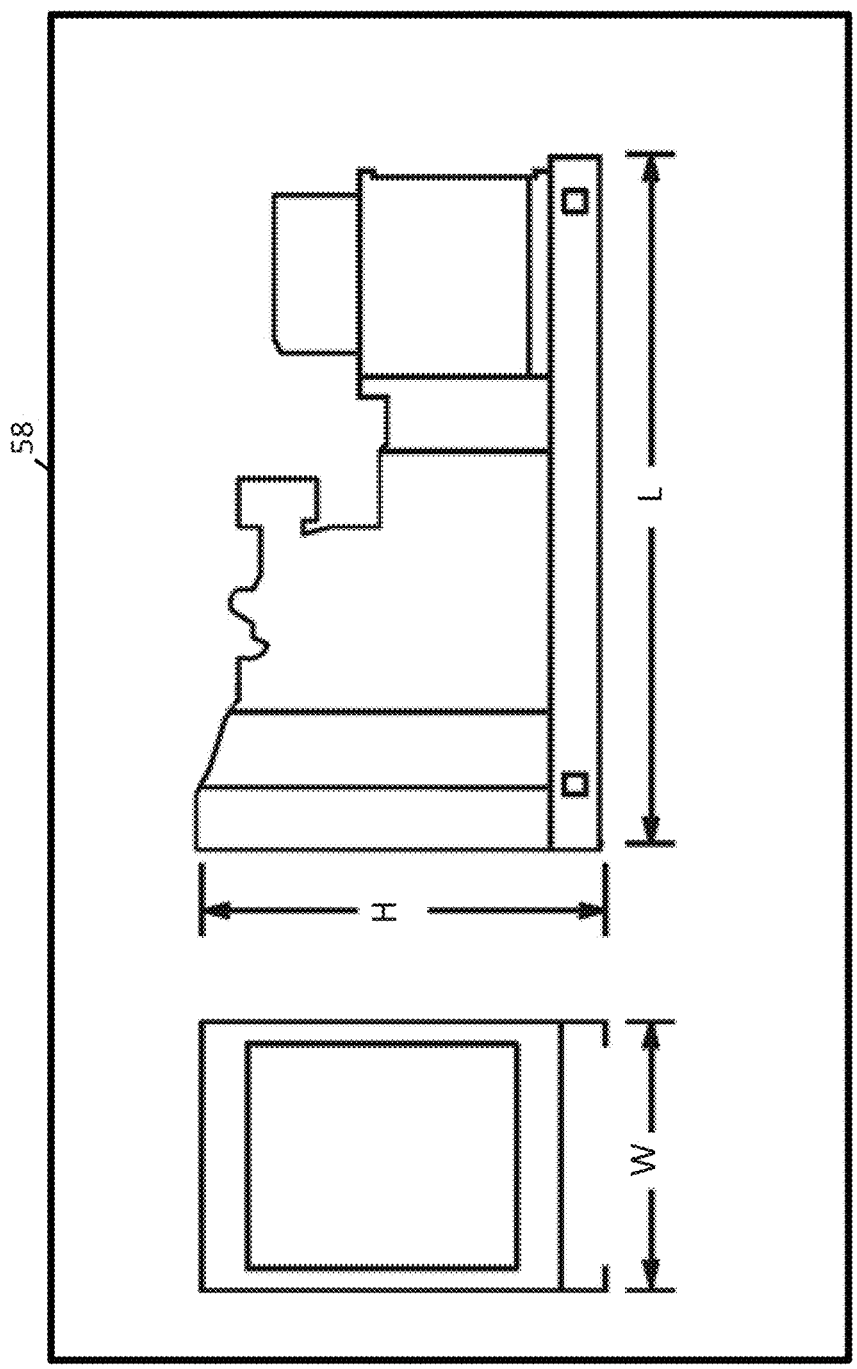
FIG. 13 illustrates an example dimension diagram for the report of FIG. 12.

FIG. 13 illustrates an example dimension diagram for the report of FIG. 12. The report 50 may also dimensions 58 for the selected generator or combination of generators. The dimensions may include a length, width, and height. The dimensions 58 may specify the slab size. The dimensions 58 may specify clearance between the generator and the walls of the room.

Figure 14:
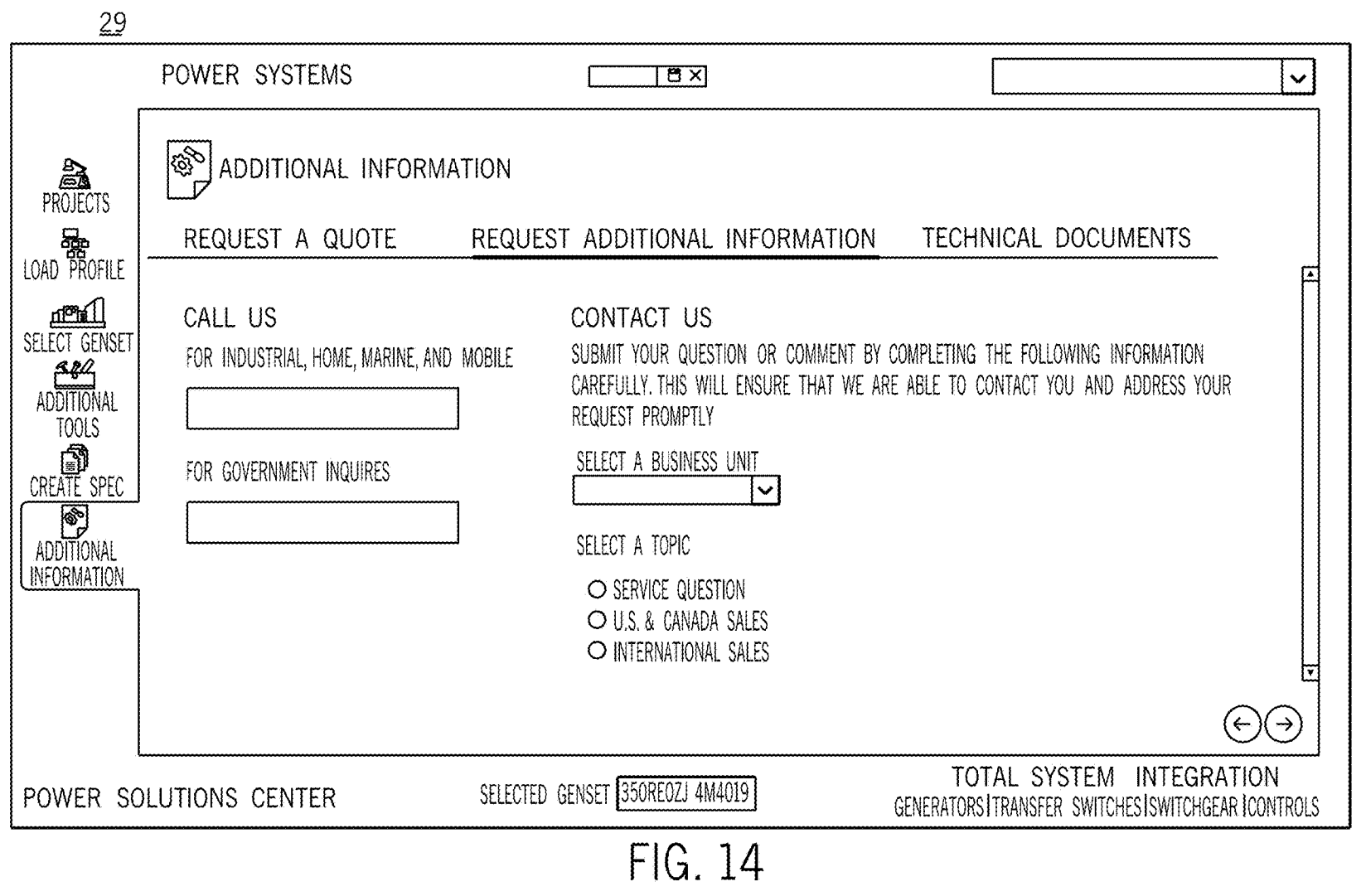

FIG. 14 illustrates an example request for quote interface 29. The request for quote interface 29 allows the user of the customer device 10 to interact with the manufacturer device 12. The user may initiate the customer device 10 to send a file representing the project, the report, the single line diagram, or other information to the manufacturer device 12. The manufacturer device 12 may return a price quote or otherwise contact the user. The customer device 10 may send the report or sizing information to multiple dealers and receive quotes from multiple dealers. The customer device 10 may send the sizing or report information to the nearest authorized dealer. The file representing the project or other sizing data may be fed directly into a quoting system to automatically return a price quote to the customer device 10.

The customer device 10 may also interact with the manufacturer device 12 using a bill of sale. The bill of sale may list part numbers for devices in the single line diagram. The bill of sale may list any combination of generators, transfer switches, transformers, or other devices. The manufacturer device 12 may generate an order based on the bill of sale.

Figure 15:
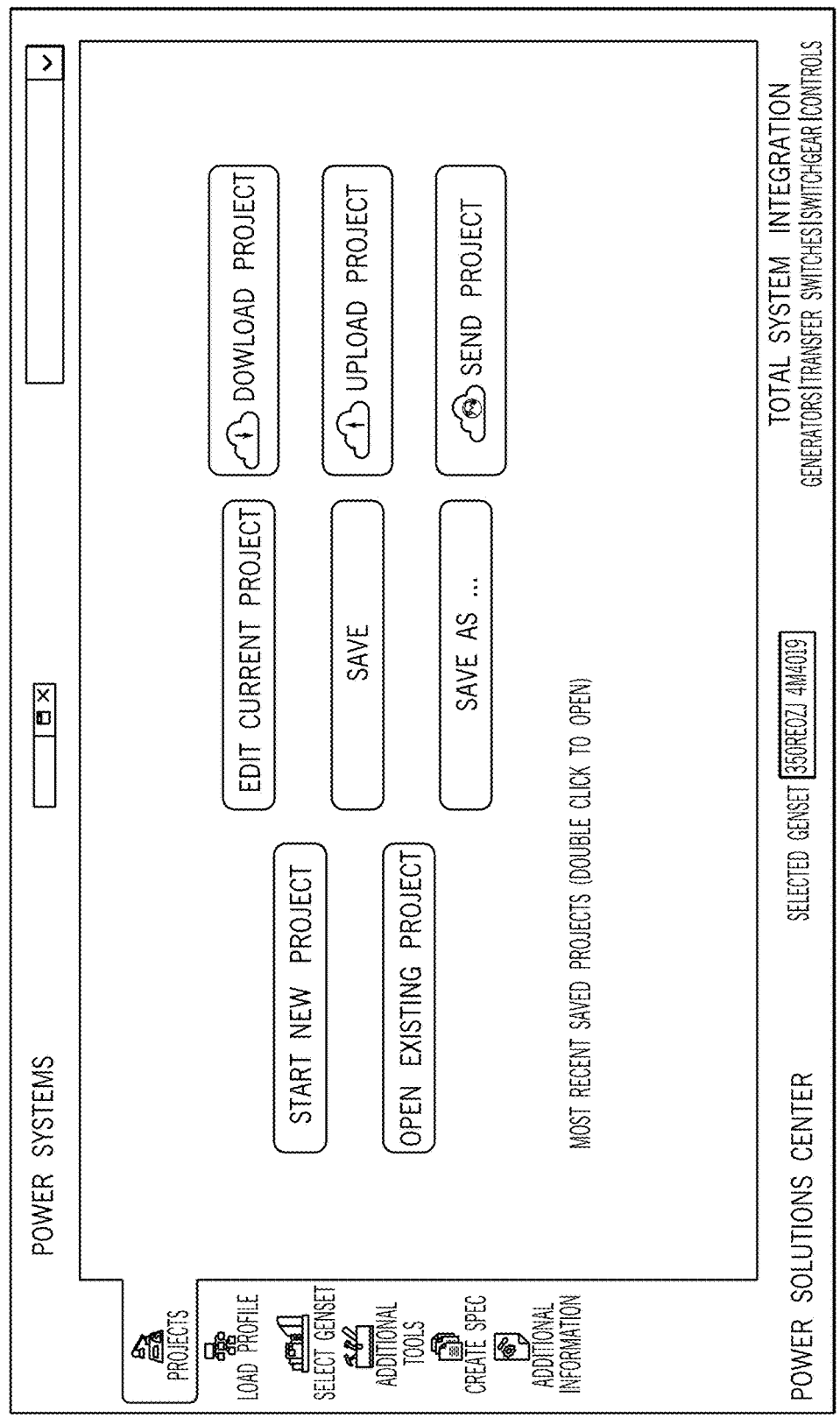
FIG. 15 illustrates an example top level interface for initiating the generating sizing selection process.

FIG. 15 illustrates an example top level interface for initiating the generating sizing selection process. From the top level interface single line diagram may be saved and opened from local memory and exchanged with other users or developers. In one example, the customer device 10 may import values from a spread sheet. For example, data describing the load sizes may be imported to automatically define the single line diagram. Similarly, the customer device 10 may export values for the single line diagram into a spreadsheet.

Figure 16:
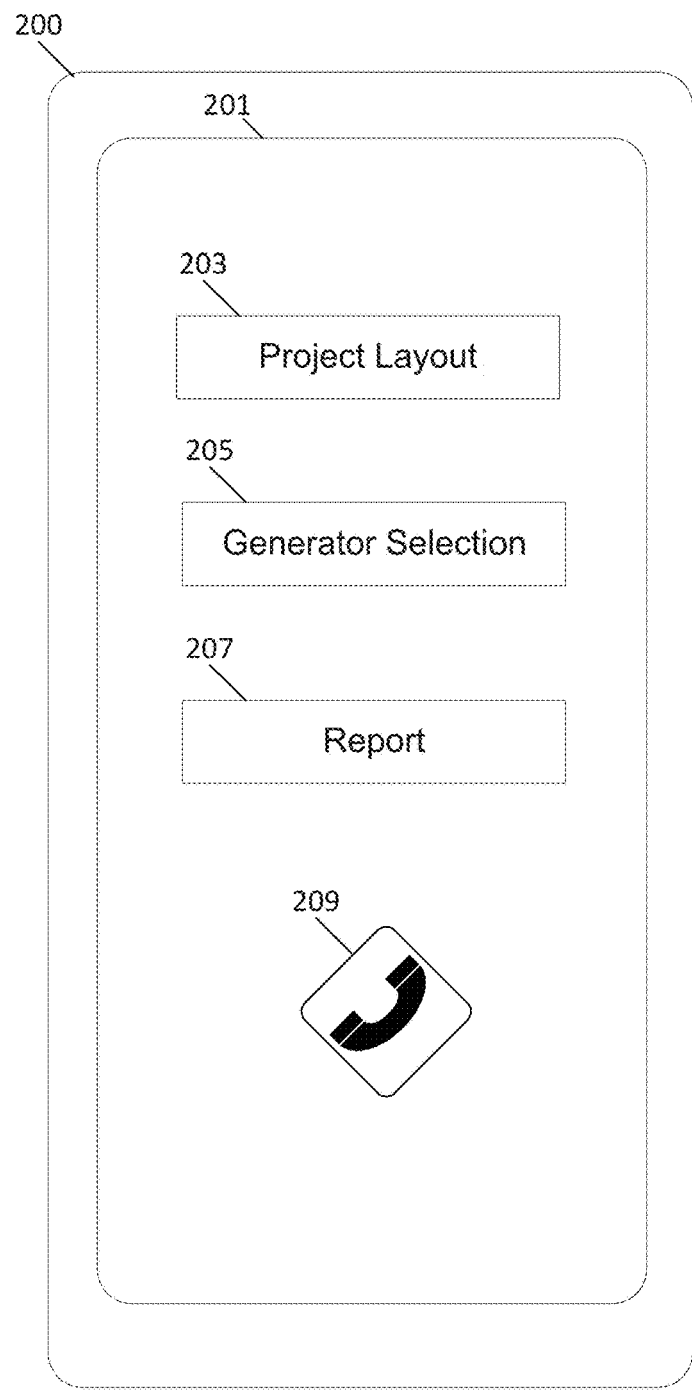
FIG. 16 illustrates a mobile interface for a mobile device.

FIG. 16 illustrates a mobile interface for a mobile device 200. The mobile device 200 may be the customer device 10. The mobile device 200 may include a display 201 included one or more user inputs for selected the project layout 203, the generator selection 205, and the report 207. The user may initiate communication with the manufacturer device 12 using the communication input 209. The user may carry the mobile device 200 to a facility and enter load devices, sources, breakers, transformers, and/or switches in the project layout 21 in real time as the user observes the devices at the facility.

The project layout 21 may also be used to model a single line diagram for a power system that is connected to a utility in addition to or instead of a generator. The customer device 10 may allow the user to calculate costs, efficiencies, power usage and other properties of the power system.

The customer device 10 may identify alternator short circuit capability or fault currents based on the single line diagram. The fault current is the current that would cause a risk that the generator system fails. The customer device 10 may calculate the optimal size for a breaker or other protection device based on the fault current.

The customer device 10 may apply the single line diagram to a load shedding system. The customer device 10 may run a simulation based on the single line diagram to determine how the system would perform if one or more generator failed or was out for maintenance. The load shedding feature may display a point of failure or a time period of failure based on the loads in the single line diagram. The customer device 10 may determine what loads and when to remove loads from the single line diagram to keep the system running. This would allow proper operation of the remaining generator(s).

Figure 17:
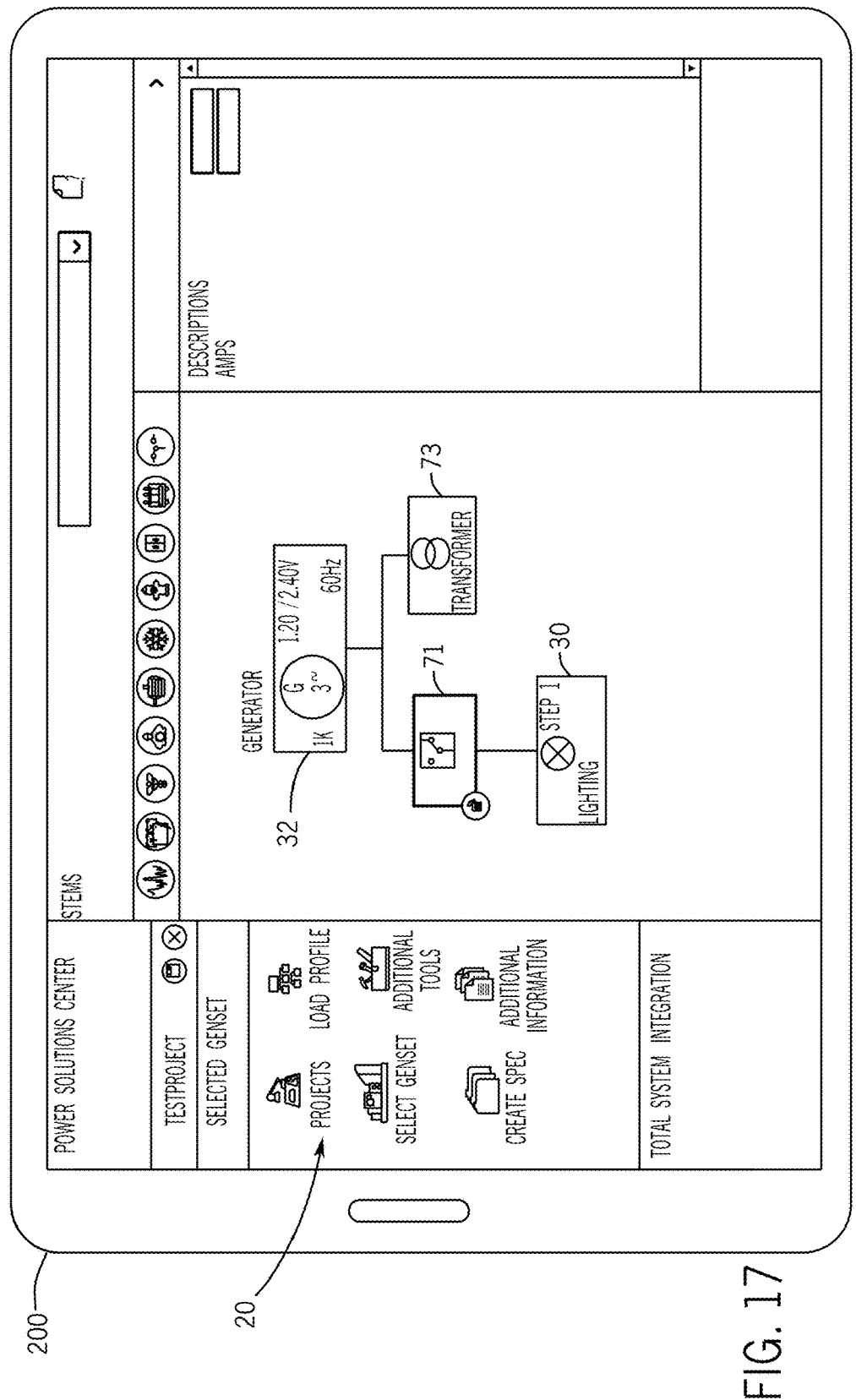
FIG. 17 illustrates another example mobile interface for a mobile device.
Figure 18:
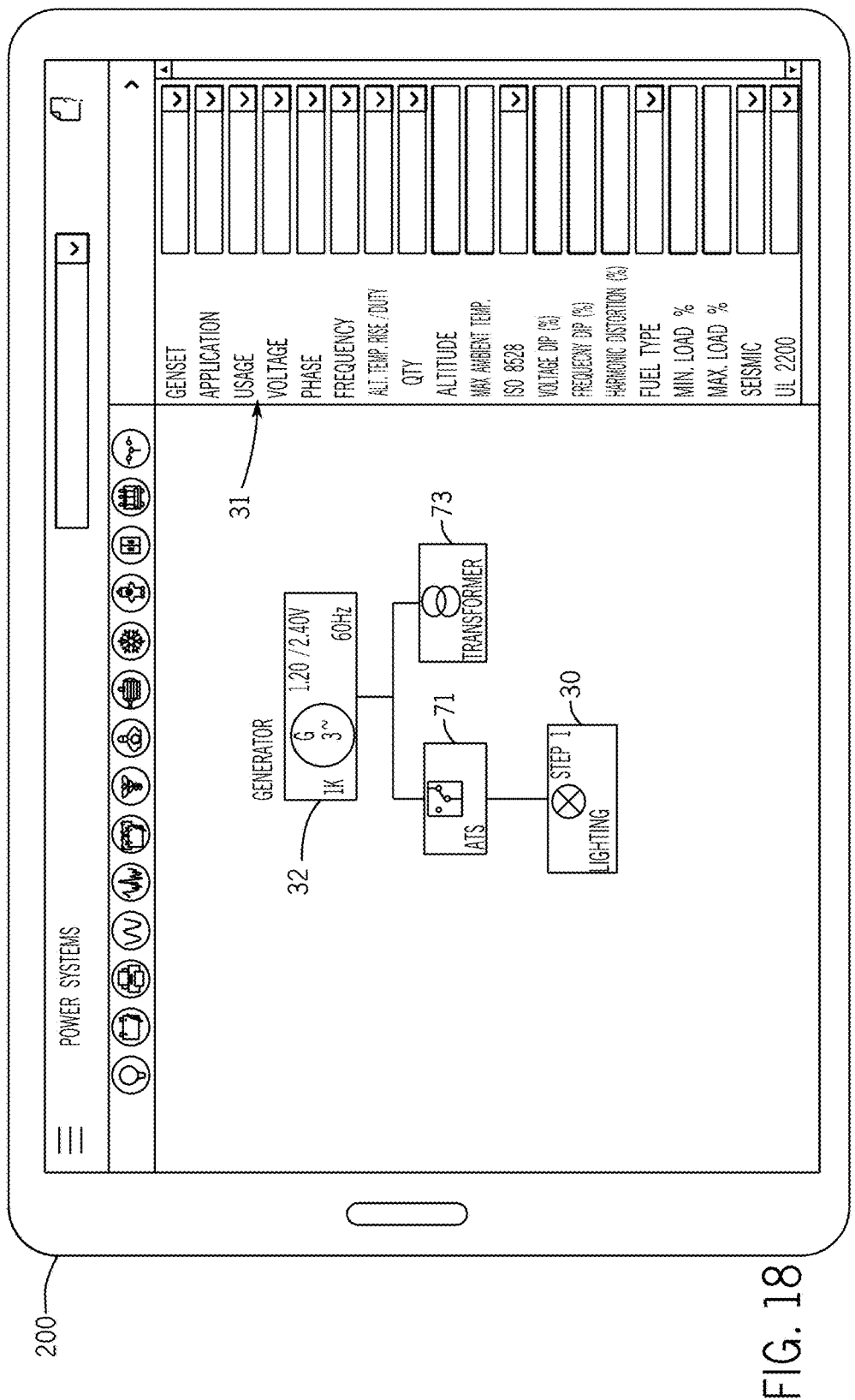
FIG. 18 illustrates another example mobile interface for a mobile device.

FIG. 17 illustrates another example mobile interface for a mobile device 200. The mobile interface may include a set of navigation icons 20, a set of load icons 30, a properties pane 31, a source icon 32, an ATS 71 and a transformer 73. The set of navigation icons 20 may automatically slide out of view or be minimized when not in use. The user may touch the mobile interface near a location near the navigation icons 20 in order to access the navigation icons 20. FIG. 18 illustrates another example mobile interface for a mobile device 200. In the instance of FIG. 18, the navigation icons 20 are hidden and the properties pane 31 appears. The properties pane 31 may automatically slide out of view or be minimized when not in use. The user may touch the mobile interface near a location near the properties pane 31 in order to access the navigation icons 20.

Figure 19:
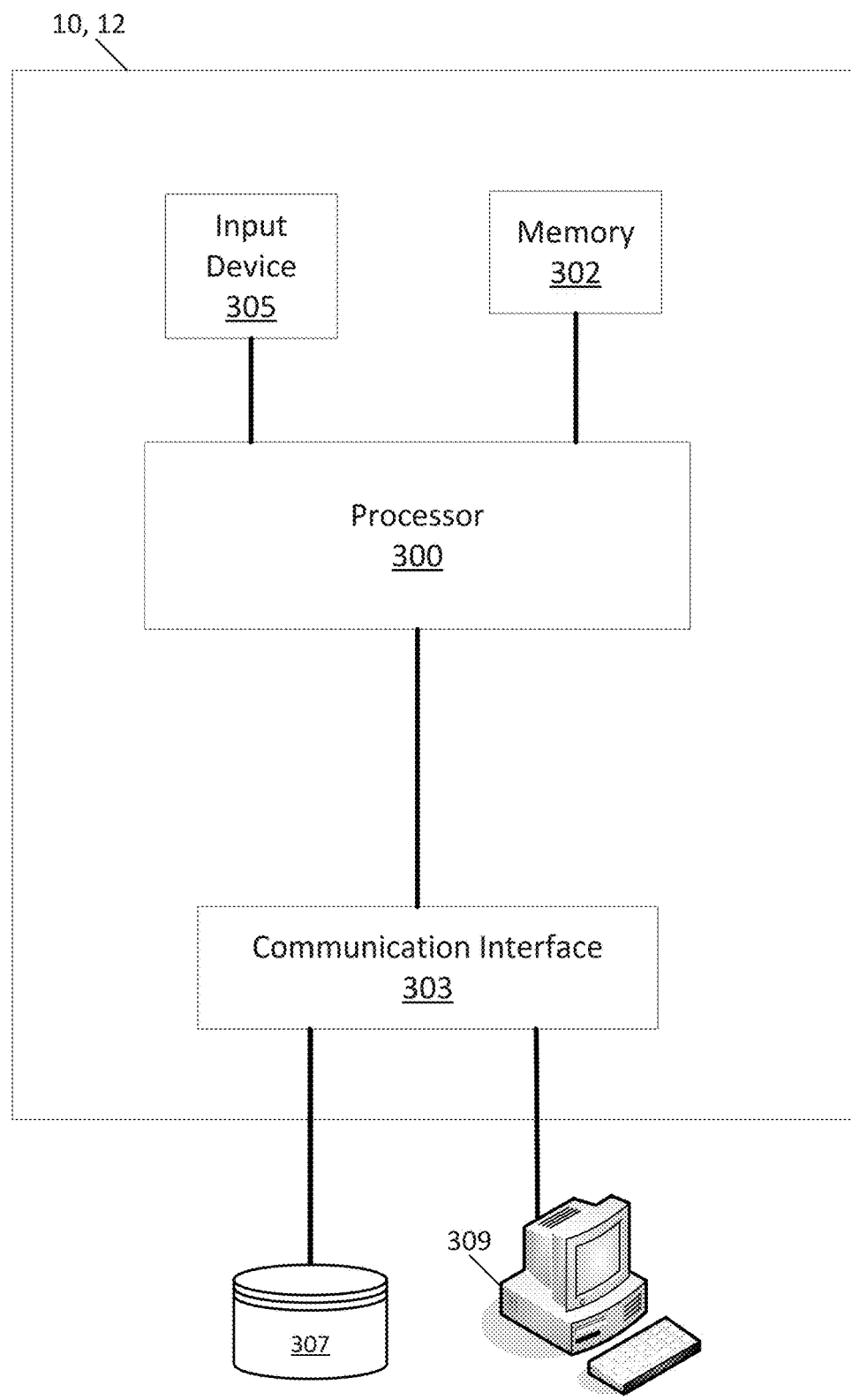
FIG. 19 illustrates an example computing device.
Figure 20:
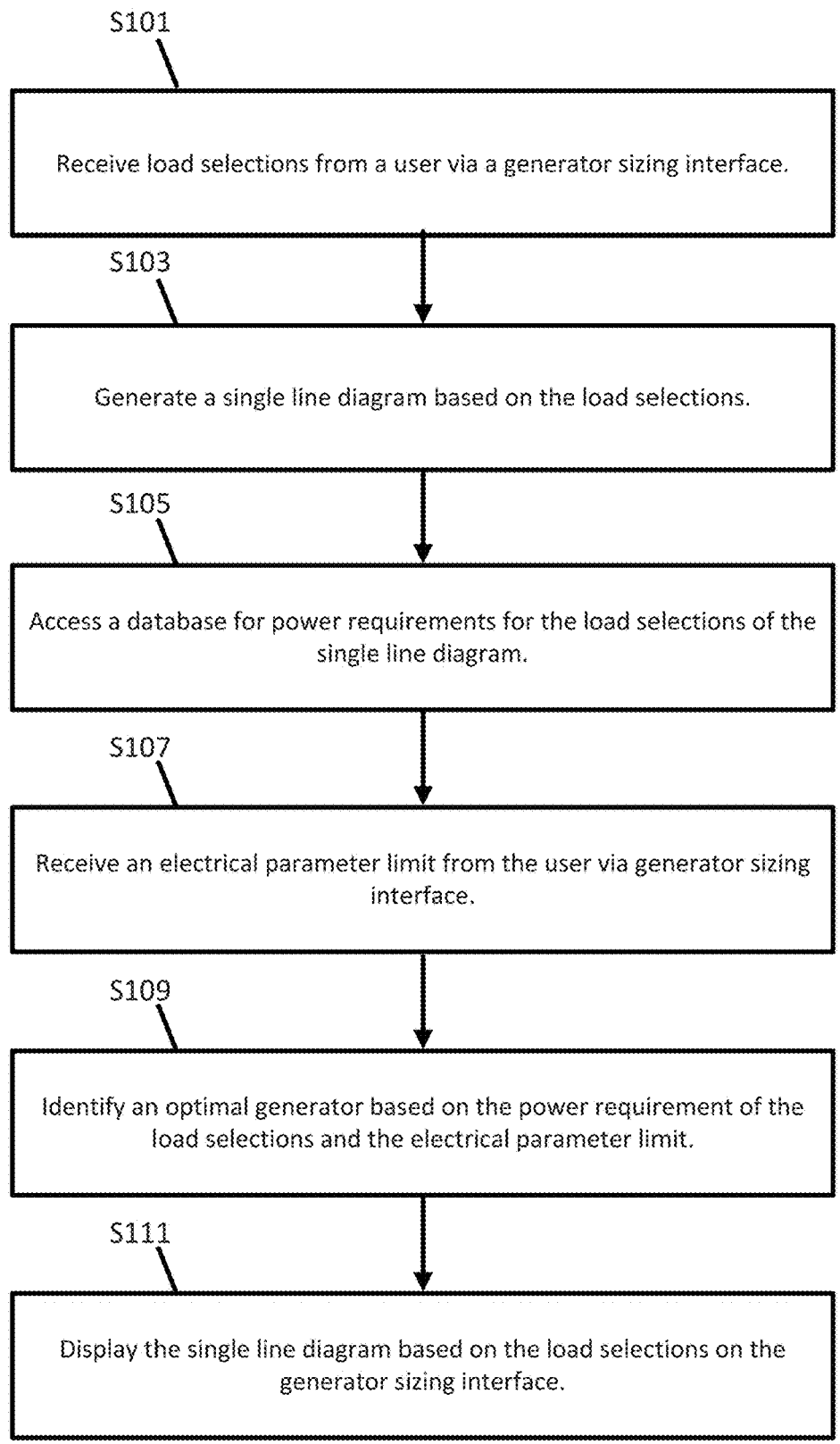
FIG. 20 illustrates an example flow chart for a generator sizing selection using the computing device of FIG. 19.

FIG. 19 illustrates an example for the customer device 10 or the manufacturer device 12 (alternatively, "computing device"). The computing device includes a processor 300, an input device 305, a communication interface 303, a memory 302, and a display. The display may be integrated with the computing device or supplied by workstation 309. The database 307 may include any of the load properties, source properties, and sizing calculations algorithms described above. The processor 300 may analyze any of the load properties and device characteristics described above and execute the sizing calculation algorithms. Additional, different, or fewer components may be included. FIG. 20 illustrates an example flow chart for a generator sizing selection using the computing device of FIG. 19. Additional, different, or fewer acts may be included.

At act S101, input device 305 receives load selections from a user via a generator sizing interface. The input device 305 may receive a user selection for a type of power system such as single phase power system or three phase power system. The input device 305 may receive the load selections through a selection may on a touch screen. Alternatively, the load selections may be received from a spreadsheet that is uploaded through a website. In one implementation, the load selections may be extracted from a schematic or image file that is generated by the customer or photographed using the camera. The processor 300 may perform an image analysis on the image to identify the load selections.

At act S103, the processor 300 generates a single line diagram based on the load selections. The single line diagram may be defined according to a set of rules stored in memory 302. The single line diagram may represent a single phase system or a three phase system.

At act S105, the processor 300 accesses a database stored in memory 302 for power requirements for the load selections of the single line diagram. The power requirements may be organized in a lookup table. At act S107, the communication interface 303 receives an electrical parameter limit from the user via the generator sizing interface. The electrical parameter limit may be any of the examples provided herein such as a frequency dip limit, a voltage dip limit, or a THD limit.

At act S109, the processor 300 identifies an optimal generator based on the power requirement of the load selections and the electrical parameter limit. The processor 300 may identify the generator that provides the load requirements at the lowest cost. The cost may be an initial cost and/or an operating costs. The processor 300 may assign a first weight to the cost factor of the selection and a second weight to the electrical parameter factor of the selection. The processor 300 may execute a weighting algorithm that balances the cost and the electrical parameter limit when selecting the optimal generator.

At act S111, the computing device displays the single line diagram based on the load selections on the generator sizing interface. In addition, the computing device may reorder the selected positions according to a predetermined order. The predetermined order may be in order of load requirements or an order in type of load.

Figure 21:
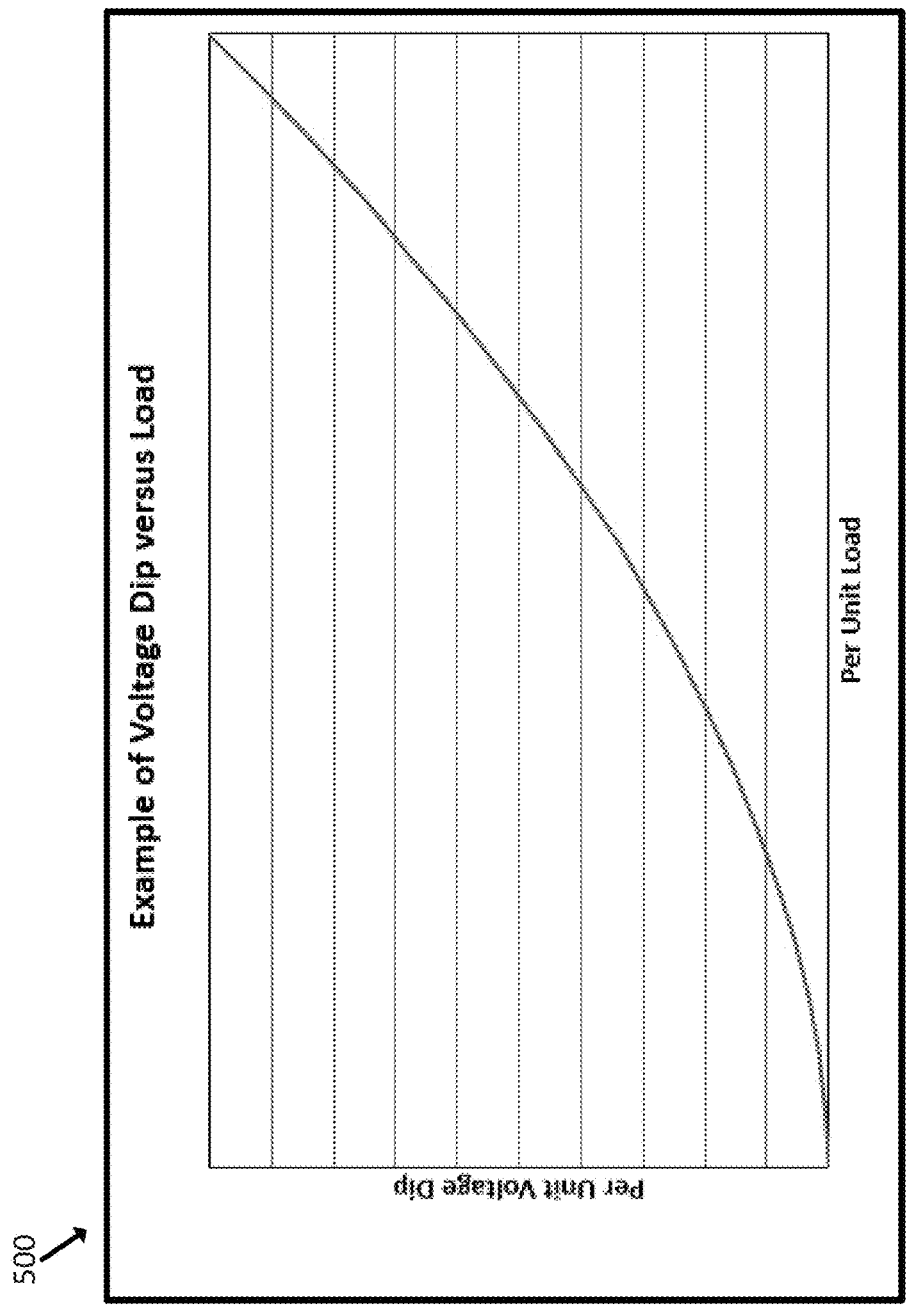
FIG. 21 illustrates an example voltage dip calculation.

FIG. 21 illustrates an example voltage dip calculation. The voltage dip is an electrical parameter limit that may be entered via the generator sizing interface and used to select the optimal generator. The voltage dip may be calculated as a function of the load selections made on the generator sizing interface and one or more possible generators stored in memory. In one example, the voltage dip (VD) is calculated as a function of a load value (L) and one or more constant values (a, b, c,) according to Equation 1 or Equation 2:

$$VD = a*L^c + b \qquad \text{Eq. 1}$$

$$VD = (a*L^e + b*L^f + c*L^g + d*L^h)*i \qquad \text{Eq. 2}$$

The load value (L) may be a percentage or a proportion based on a measured load divided by a maximum or rated load. The load value (L) may have various load units such as kW, kVAR, or a combination thereof. The constant values (a, b, c, d, e, f, g, h, i) may be a fractional value or integer values between 0 and 5. Example values for a include 0, 0.25, 0.5, 0.75 and 1. Example values for b include 0, 0.25, 0.5, 0.75 and 1. Examples values for c include 0.6, 0.8, 1.0, 1.2, 1.4, 1.6, 1.8, 2.0, 2.5, and 3.0. The values for a, b, and c may be variable according to characteristics of the generators in the list of possible generators. That is, different values may be used for different generators. Using Equation 1, the processor 300 is configured to calculate a maximum voltage dip from the single load diagram or the load selections, and accordingly, the optimal generator selection is based, at least in part, on the maximum voltage dip.

Figure 22:
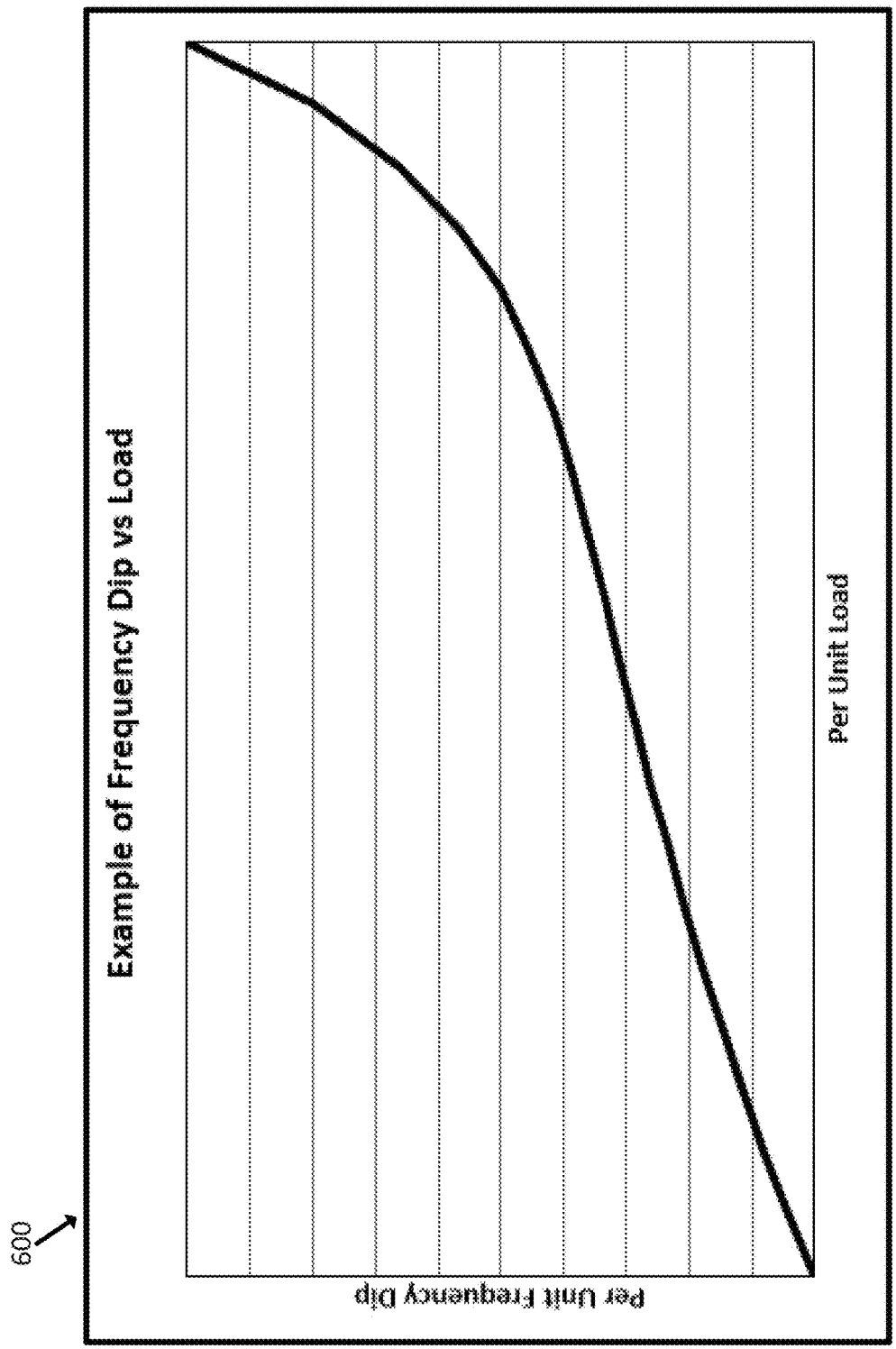
FIG. 22 illustrates an example frequency dip calculation.

FIG. 22 illustrates an example frequency dip calculation. The frequency dip is an electrical parameter limit that may be entered via the generator sizing interface and used to select the optimal generator. The frequency dip may be calculated as a function of the load selections made on the generator sizing interface and one or more possible generators stored in memory. In one example, the frequency dip (FD) is calculated as a function of a load value (L) and one or more constant values (e, f, g, h, k, m, n, o, p) according to Equation 3:

$$FD = (m*L^e + n*L^f + o*L^g + p*L^h)*k \qquad \text{Eq. 3}$$

The load value (L) may be a percentage or a proportion based on a measured load divided by a maximum or rated load. The load value (L) may have various load units such as kW, kVAR, or a combination thereof. The constant values (e, f, g, h, k, m, n, o, p) may be a fractional value or integer values between −10 and 10. Using Equation 2, the processor 300 is configured to calculate a maximum frequency dip from the single load diagram or the load selections, and accordingly, the optimal generator selection is based, at least in part, on the maximum frequency dip.

The processor 300 may also identify a relationship between the voltage dip and the frequency dip. In some generators, the relationship may be modeled as variable and in other the relationship may be static. The relationship may be a dip ratio stored in memory 302 for each of the possible generators.

The processor 300 may also calculate a total harmonic distortion (THD) from the single load diagram or the load selections. The optimal generator selection may be based, at least in part, on the calculated total harmonic distortion. The memory 302 may include a lookup table that associated the possible generators with THD values.

The processor 300 may include a general processor, digital signal processor, an application specific integrated circuit (ASIC), field programmable gate array (FPGA), analog circuit, digital circuit, combinations thereof, or other now known or later developed processor. The memory 302 may be a volatile memory or a non-volatile memory. The memories may include one or more of a read only memory (ROM), random access memory (RAM), a flash memory, an electronic erasable program read only memory (EEPROM), or other type of memory. The memory 201 may be removable from the controller 302, and the memory 15 may be removable from the engine, such as a secure digital (SD) memory card.

The communication interface 303 may include any operable connection. An operable connection may be one in which signals, physical communications, and/or logical communications may be sent and/or received. An operable connection may include a physical interface, an electrical interface, and/or a data interface. The communication interface 303 provides for wireless and/or wired communications in any now known or later developed format.

The network 11 may include wired networks, wireless networks, or combinations thereof. The wireless network may be a cellular telephone network, an 802.11, 802.16, 802.20, or WiMax network. Further, the network may be a public network, such as the Internet, a private network, such as an intranet, or combinations thereof, and may utilize a variety of networking protocols now available or later developed including, but not limited to TCP/IP based networking protocols.

The memories may be a non-transitory computer-readable medium. While the non-transitory computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method comprising:
   receiving load selections from a user via a generator sizing interface of a display;
   generating a single line diagram based on the load selections;
   displaying the single line diagram based on the load selections on the generator sizing interface;
   accessing a database for power requirements for the load selections of the single line diagram;
   calculating a maximum frequency dip from the single load diagram via the generator sizing interface and the load selections via the generator sizing interface and the display; and
   identifying an optimal generator based, at least in part, on the power requirement of the load selections and based, at least in part, on the maximum frequency dip.

2. The method of claim 1, further comprising:
calculating a maximum voltage dip from the single load diagram or the load selections, wherein the optimal generator is based, at least in part, on the maximum voltage dip.

3. The method of claim 1, further comprising:
calculating a total harmonic distortion from the single load diagram or the load selections, wherein the optimal generator is based, at least in part, on the total harmonic distortion.

4. The method of claim 1, further comprising:
receiving an electrical parameter limit from the user via the generator sizing interface, wherein the optimal generator is selected based on the electrical parameter limit.

5. The method of claim 4, wherein the electrical parameter limit is a total harmonic distortion, a maximum frequency dip, or a maximum voltage dip.

6. The method of claim 1, further comprising:
identifying an auxiliary component parameter for the optimal generator based at least in part on the load selections or the single line diagram.

7. The method of claim 6, wherein the auxiliary component parameter includes a fuel line size, an exhaust pipe size, or a support pad size.

8. The method of claim 1, wherein the load selections include at least one linear load and at least one non-linear load.

9. The method of claim 8, wherein the at least one linear load includes an air conditioner, a fire pump, or an elevator, and the at least one non-linear load includes lighting, battery charger, office equipment, an uninterruptible power supply, or medical equipment.

10. The method of claim 1, further comprising:
receiving a user command to drag the load selections to selected positions along the single line diagram via the generator sizing interface.

11. The method of claim 10, further comprising:
reordering the selected positions according to a predetermined order.

12. The method of claim 1, further comprising:
receiving at least one branch selection via the generator sizing interface.

13. The method of claim 12, wherein the at least one branch selection includes a generator set, a transformer, a breaker, or a transfer switch.

14. The method of claim 1, wherein the optimal generator is identified from a list of possible generators, the method further comprising:
sorting the list of possible generators based on a user input.

15. The method of claim 2, wherein the voltage dip (VD) is calculated as a function of a load value (L) from the single load diagram or the load selections and one or more constant values (a, b, c,) according to:

$$VD = a*L^c + b.$$

16. The method of claim 1, further comprising:
generating a report including the power requirement;
sending the report to a manufacturer device;
receiving a message in response to the report from the manufacturer device; and
displaying the message via the generator sizing interface.

17. A mobile device comprising:
a display configured to illustrate a single line diagram based on load selections on a generator sizing interface;
an input device configured to receive load selections from a user via the generator sizing interface;
a memory including a database for power requirements for the load selections;
a processor configured to generate a single line diagram based on the load selections and access the database for power requirements for the load selections of the single line diagram,
wherein the processor is configured to calculate a maximum voltage dip from the single load diagram and the load selections via the generator sizing interface of the display,
wherein an optimal generator size is identified based, at least in part, on the power requirement of the load selections and based, at least in part, on the maximum voltage dip,
wherein the processor is configured to generate a report including the power requirement and send the report to a manufacturer device.

18. The method of claim 17, wherein the display includes the input device.

19. A method comprising:
receiving load selections from a user via a generator sizing interface of a display;
generating a single line diagram based on the load selections;
accessing a database for power requirements for the load selections of the single line diagram;
receiving an electrical parameter limit from the user via the generator sizing interface;
calculating a maximum frequency dip from the single load diagram and the load selections via the generator sizing interface of the display;
identifying an optimal generator based on the power requirement of the load selections and the electrical parameter limit and the maximum frequency dip; and
displaying the single line diagram based on the load selections on the generator sizing interface.

* * * * *